(12) United States Patent
Rogers et al.

(10) Patent No.: US 11,209,780 B2
(45) Date of Patent: ***Dec. 28, 2021

(54) ADJUSTABLE TIMER

(71) Applicant: Time Timer LLC, Cincinnati, OH (US)

(72) Inventors: David M. Rogers, Cincinnati, OH (US); Tricia L. Wright, San Francisco, CA (US)

(73) Assignee: Time Timer LLC, Cincinnati, OH (US)

( * ) Notice: Subject to any disclaimer, the term of this patent is extended or adjusted under 35 U.S.C. 154(b) by 435 days.

This patent is subject to a terminal disclaimer.

(21) Appl. No.: 16/378,895

(22) Filed: Apr. 9, 2019

(65) Prior Publication Data

US 2019/0235444 A1 Aug. 1, 2019

Related U.S. Application Data

(63) Continuation of application No. 15/808,955, filed on Nov. 10, 2017, now Pat. No. 10,303,123.

(51) Int. Cl.
| | | |
|---|---|---|
| *G04F 3/00* | (2006.01) | |
| *G04F 3/06* | (2006.01) | |
| *G04B 45/00* | (2006.01) | |
| *G04F 3/02* | (2006.01) | |
| *G09B 19/12* | (2006.01) | |
| *G04B 19/04* | (2006.01) | |

(52) U.S. Cl.
CPC ............ *G04F 3/00* (2013.01); *G04B 45/0092* (2013.01); *G04F 3/02* (2013.01); *G04F 3/022* (2013.01); *G04F 3/025* (2013.01); *G04F 3/06* (2013.01); *G09B 19/12* (2013.01); *G04B 19/046* (2013.01)

(58) Field of Classification Search
CPC ... G04F 3/00; G04F 3/02; G04F 3/022; G04F 3/033; G04F 3/025; G04B 19/12; G04B 19/046; G04B 37/127; G04B 45/0092
See application file for complete search history.

(56) References Cited

U.S. PATENT DOCUMENTS

| | | |
|---|---|---|
| 680,018 A | 8/1901 | Brake |
| 776,297 A | 11/1904 | Cordeiro |

(Continued)

FOREIGN PATENT DOCUMENTS

| | | |
|---|---|---|
| DE | 3731872 | 8/1988 |
| GB | 2485821 | 5/2012 |

OTHER PUBLICATIONS

"Time Timer Visual Schedule Kit Installation Instructions," Mar. 8, 2016, retrieved from https://vimeo.com/158185933 on Aug. 14, 2021, full document (Year: 2016).*

(Continued)

*Primary Examiner* — Daniel P Wicklund
(74) *Attorney, Agent, or Firm* — Wood Herron & Evans LLP

(57) ABSTRACT

An adjustable timer teaches time in a simple manner to those having difficulty understanding the concept of time. The timer displays remaining and elapsed time. The timer may be set to rotate a shaft at different speeds. A colored disk is attached to the shaft. Boards having faces with different numerical indicia reside in a cavity and may be interchanged by a user. The exposed board face corresponds to the setting of the timer such that one full rotation of the shaft and disk corresponds to the numerical indicia of the exposed board face.

20 Claims, 22 Drawing Sheets

(56) References Cited

U.S. PATENT DOCUMENTS

| | | |
|---|---|---|
| D43,733 S | 3/1913 | Buckland |
| 2,011,517 A | 8/1935 | Geoffrion |
| 2,255,188 A | 9/1941 | Rieper |
| 2,329,447 A | 9/1943 | Anderson |
| 2,336,563 A | 12/1943 | Nielsen |
| 2,816,373 A | 12/1957 | Caddy |
| 3,608,214 A | 9/1971 | Rancati |
| 3,668,858 A | 6/1972 | Hartwig |
| 3,803,831 A | 4/1974 | Horzick |
| 4,368,045 A | 1/1983 | Kuh |
| D268,686 S | 4/1983 | Wolf |
| D271,567 S | 11/1983 | Powell |
| D298,609 S | 11/1988 | Dawson, Jr. |
| 4,885,731 A | 12/1989 | Massaro |
| 4,945,522 A | 7/1990 | Radel |
| 4,995,018 A * | 2/1991 | Edwards .............. G04F 1/005 368/107 |
| 5,044,961 A | 9/1991 | Bruskewitz |
| D346,965 S | 5/1994 | Wolff |
| D347,656 S | 6/1994 | Bumbarger |
| 5,646,913 A | 7/1997 | Quesenberry |
| 5,662,479 A | 9/1997 | Rogers |
| D434,993 S | 12/2000 | Barker |
| 6,158,868 A | 12/2000 | Chien |
| 6,354,841 B1 | 3/2002 | Bradt |
| 6,359,840 B1 | 3/2002 | Evans |
| 6,683,821 B1 * | 1/2004 | Emtyazi .............. G04B 19/046 368/233 |
| 6,962,494 B1 | 11/2005 | Olson |
| 7,274,375 B1 | 9/2007 | David |
| D590,735 S | 4/2009 | Rogers |
| 7,729,206 B2 | 6/2010 | Gordon et al. |
| 7,773,464 B2 | 8/2010 | Rogers |
| 7,830,752 B2 | 11/2010 | Rogers |
| 8,072,846 B2 | 12/2011 | Gordon et al. |
| D671,016 S | 11/2012 | Rogers et al. |
| 8,526,273 B2 | 9/2013 | Gordon et al. |
| D705,089 S | 5/2014 | Rogers et al. |
| D720,638 S | 1/2015 | Rogers |
| D744,365 S | 12/2015 | Rogers |
| D746,373 S | 12/2015 | Racosky |
| D770,310 S | 11/2016 | Rogers et al. |
| 9,599,962 B1 | 3/2017 | Erickson |
| D785,471 S | 5/2017 | Rogers et al. |
| D796,349 S | 9/2017 | Rogers et al. |

OTHER PUBLICATIONS

Visual Schedule Kit for the Time Timer, published in 2014, Time Timer, full document (Year: 2014).

* cited by examiner

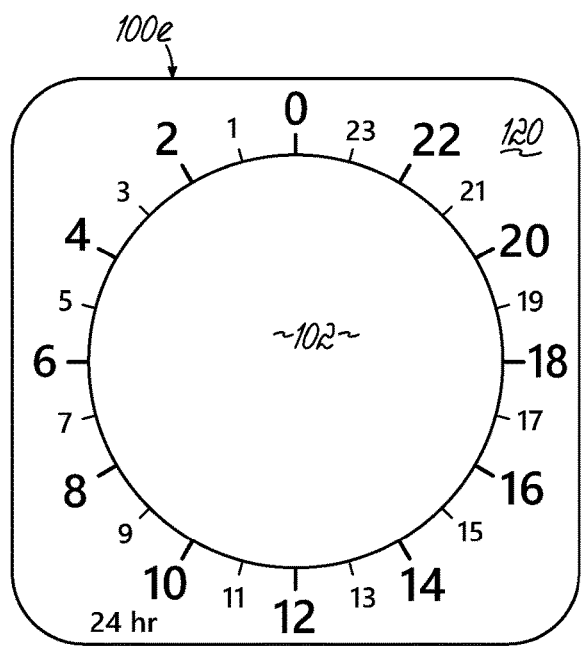
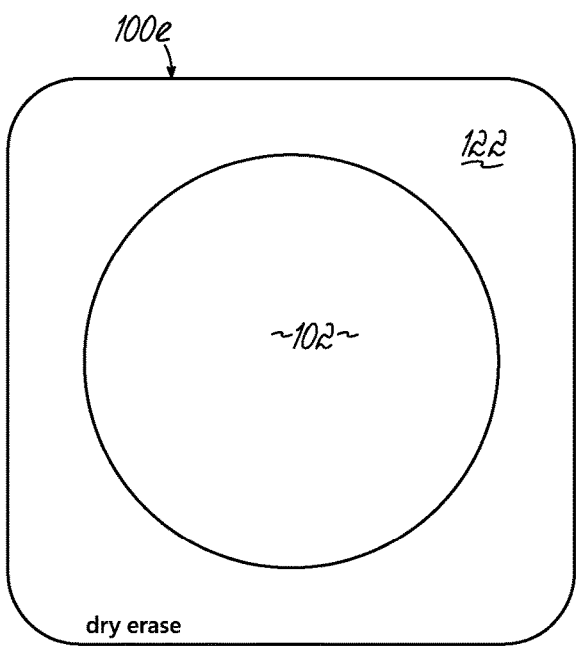
FIG. 11I        FIG. 11J

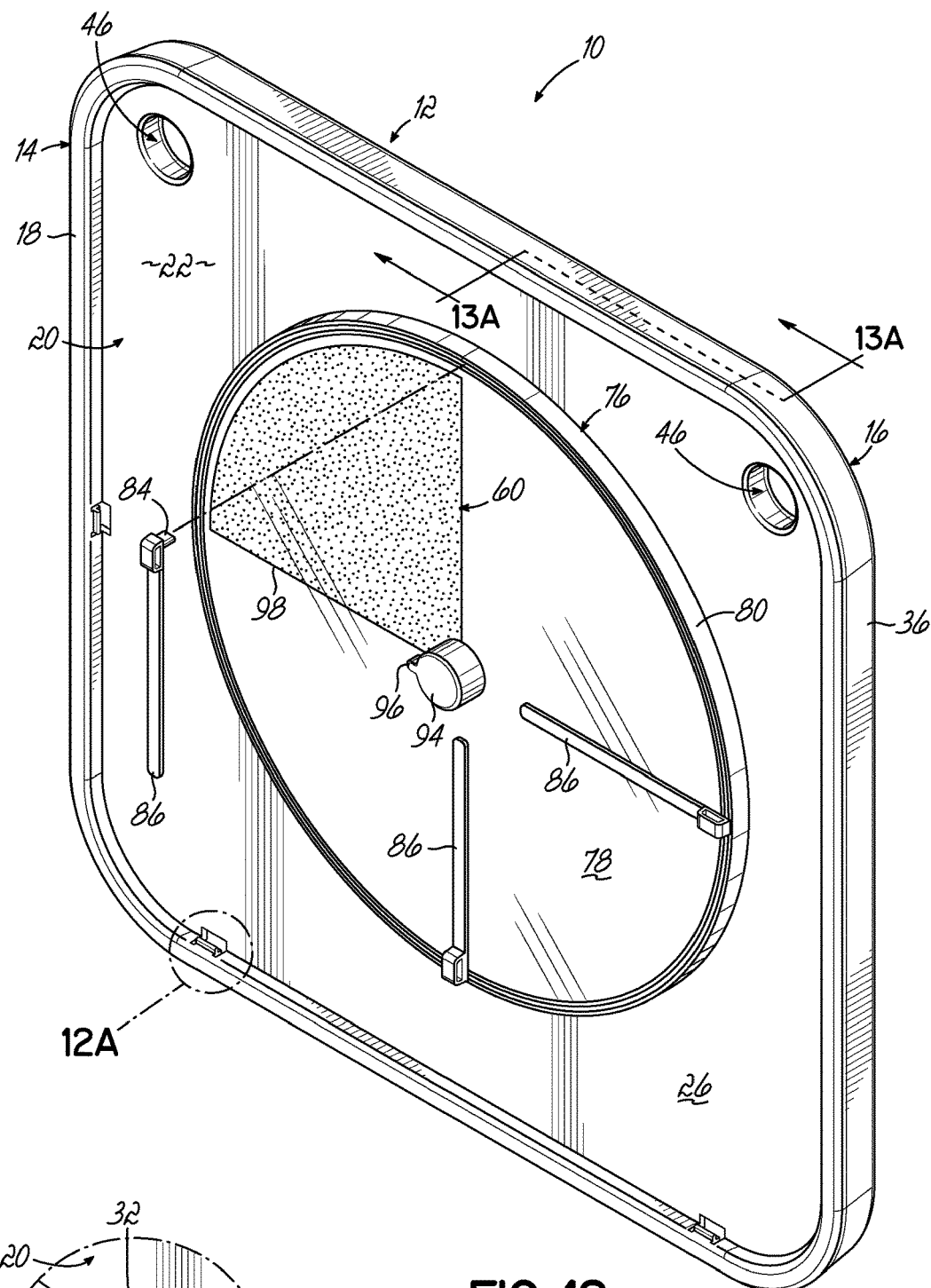
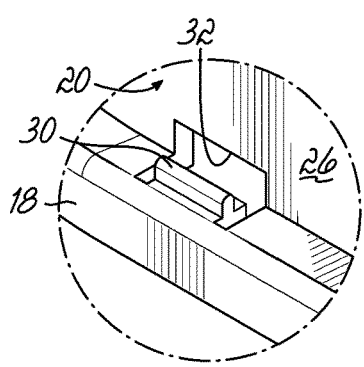
FIG. 12
FIG. 12A

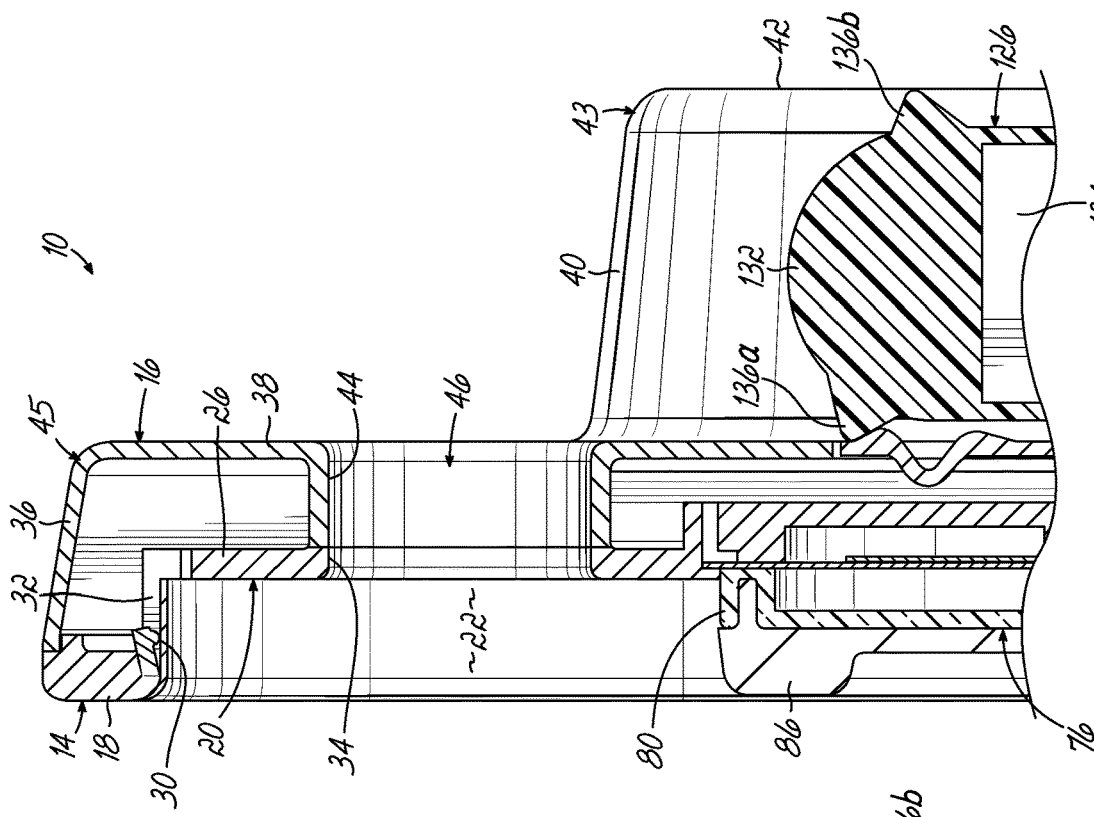
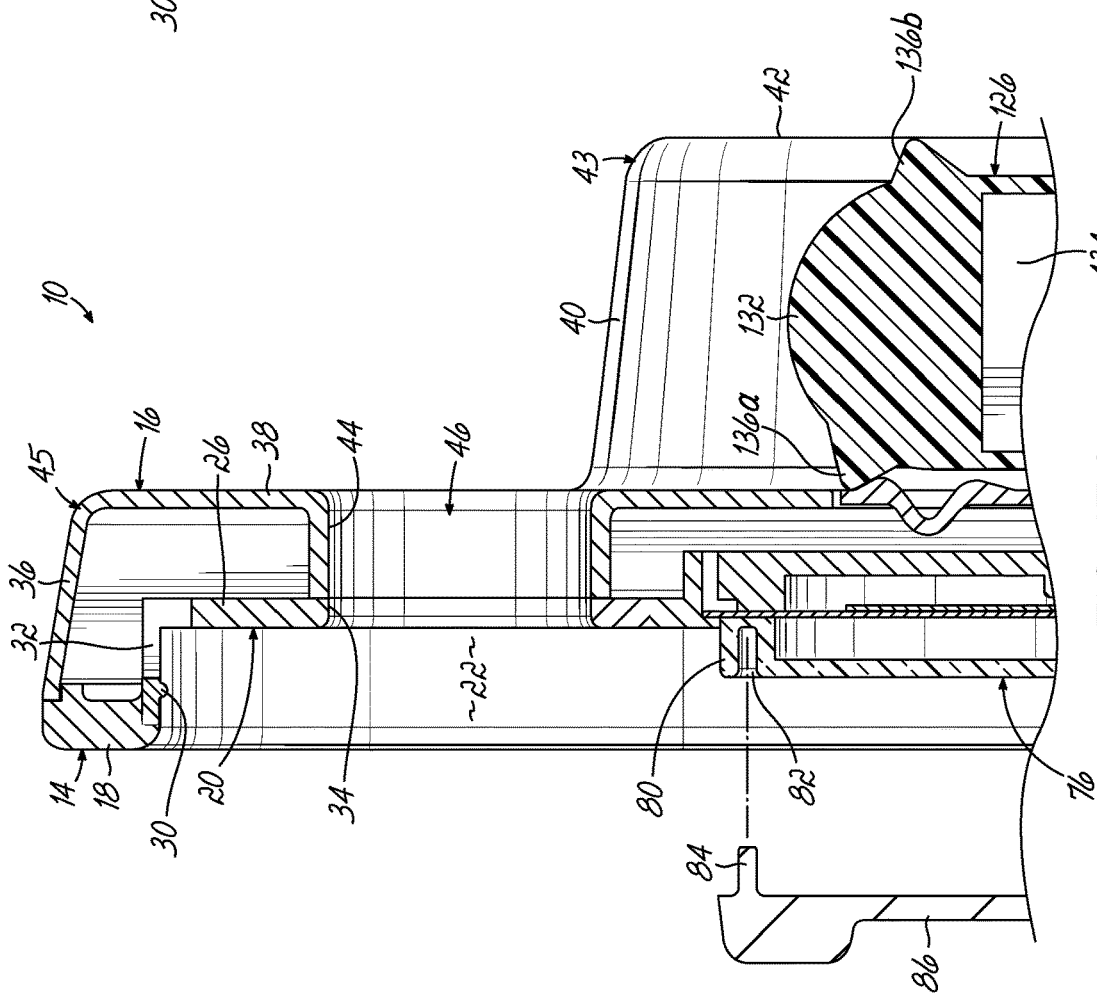

ADJUSTABLE TIMER

CROSS REFERENCE TO RELATED APPLICATIONS

This application is a continuation of U.S. patent application Ser. No. 15/808,955 filed Nov. 10, 2017 which is fully incorporated by reference herein.

FIELD OF THE INVENTION

This invention relates generally to an apparatus and method for teaching time and, more particularly, to an apparatus and method of displaying remaining and elapsed time.

BACKGROUND OF THE INVENTION

Numerous timers show elapsed time in a visual form. U.S. Pat. No. 5,662,479 discloses a timer which discloses a disk which moves in a clockwise direction to visualize the amount of time left from a sixty-minute period. Numerical indicia marks printed on a stationary face illustrate the sixty-minute period. A battery powers a control module which rotates an output shaft to which the disk is attached. The control module rotates the output shaft at an appropriate speed such that one full rotation of the output shaft equals one full rotation of the disk. As the disk rotates in the clockwise direction the visible portion of the disk decreases indicating to the user than a certain amount of time remains from the original time.

One of the limitations is that the output shaft rotates only at one speed such that a full rotation of the shaft equals sixty minutes or one hour. Consequently, the numerical indicial printed on the timer's display face are in increments which add up to sixty minutes. The timer is not suitable for displaying elapsed or remaining times greater than one hour. For example, the timer of U.S. Pat. No. 5,662,479 is not suitable for someone wishing to visualize how much time remains from an initial period of two hours. Additionally, the timer of U.S. Pat. No. 5,662,479 is not ideal for someone wishing to visualize how much time remains from an initial period of thirty minutes.

Therefore, there is a need for a visual timer having a control module which may be adjusted to rotate at different speeds.

There is further a need for a visual timer using a rotating disk which may display elapsed or remaining times greater than one hour.

There is further a need for a visual timer using a rotating disk which may display elapsed or remaining time and has a full display representing a period less than one hour.

SUMMARY OF THE INVENTION

According to one aspect of the invention, an apparatus for displaying remaining and elapsed time comprises a generally rectangular body having a generally rectangular front tray and a generally rectangular rear tray secured to the generally rectangular front tray. The generally rectangular front tray of the generally rectangular body has a circular recess.

The generally rectangular body has a battery compartment for storing at least one battery. The at least one battery powers a control module located between the generally rectangular front and rear trays of the generally rectangular body. The control module includes a shaft which rotates at different speeds such that one full rotation of the shaft finishes after five minutes or fifteen minutes or thirty minutes or one hour or two hours or four hours or eight hours, for example. Any other times may be incorporated into the control module and apparatus. To determine the speed or rate at which the shaft rotates, a user rotates a knob behind the apparatus to a predetermined, marked location which controls the control module's rate of rotation of the shaft.

A rotatable colored disk is located in the recess of the generally rectangular front tray. The rotatable colored disk is secured to the shaft such that the rotatable colored disk rotates with the shaft. A stationary background disk is secured in the recess of the generally rectangular front tray in front of the rotatable colored disk. The stationary background disk has a slit through which a portion of the rotatable colored disk passes such that upon rotation of the shaft a portion of the rotatable colored disk rotates in front of the stationary background disk and becomes visible to the user. In the preferred embodiment, the shaft and rotatable colored disk rotate in a clockwise direction as time elapses. However, the shaft and rotatable colored disk may rotate in the counterclockwise direction as time passes. A circular lens located in front of the stationary background disk is secured to the generally rectangular front tray.

Boards are removable secured in a cavity in the generally rectangular front tray of the generally rectangular body with at least one biasing member. In one embodiment, the biasing members are tabs integrally formed with the generally rectangular front tray. Each of the boards has opposing faces and a circular opening through which the circular lens passes. At least one of the boards has numerical indicia marks on each face of the board to indicate different time periods. Each of the time periods corresponds to one of the time periods programmed into the control module. The generally rectangular body has openings therethrough to enable a user to remove one or more boards from the cavity of the generally rectangular front tray to expose a different face of the same board or a different board.

A positioner is secured to the shaft in front of the circular lens to enable a user to manually set the initial position of the rotatable colored disk inside the circular lens to indicate a desired time to be elapsed. In some embodiments, a generally U-shaped mounting stand is pivotally secured to the generally rectangular body.

In a second aspect, an apparatus for displaying remaining and elapsed time comprises a body having a front tray and a rear tray secured to the front tray. The front tray has a circular recess and a border. The apparatus further comprises a control module and at least one battery located between the front and rear trays of the body. The control module is powered by the at least one battery. The control module includes a shaft which rotates at different rates. The rate of rotation or speed of the shaft is set by a knob connected to the control module.

A colored disk located in the circular recess of the front tray is secured to the shaft and rotates with the shaft at the same speed to indicate remaining and elapsed time. The colored disk has a slit which allows the colored disk to move relative to a stationary background disk. The stationary background disk is secured to the front tray in front of the colored disk. The stationary background disk has a slit through which a portion of the colored disk passes upon rotation of the shaft such that a portion of the colored disk is visible in front of the stationary background disk. A positioner secured to the shaft in front of the circular lens enables a person to manually set the position of the colored disk.

Boards are removable secured in a cavity in the front tray of the body with at least one biasing member. Each of the boards has numerical indicia on at least one face of the board to indicate different time periods. Each of the time periods corresponds to one of the time periods programmed into the control module. The boards may be pushed out of the cavity by a user using openings extending through the body.

In a third aspect, an apparatus for displaying remaining and elapsed time comprises a body has a front tray and a rear tray secured together. The front tray of the body has a generally planar floor comprising a generally planar outer portion and circular recess extending rearwardly from the generally planar outer portion. The body has a battery compartment for storing at least one battery. The at least one battery powers a control module located in the body. The control module determines the speed at which a shaft rotates to rotate a colored disk secured to the shaft to indicate elapsed and remaining time. Boards are removable secured in a cavity in the front tray of the body with at least one biasing member. At least one of the boards contacts the generally planar outer portion of the floor of the front tray of the body. Each of the boards has an opening through which a lens passes. At least one of the boards has numerical indicia marks on each face of the board to indicate different time periods. Each of the time periods corresponds to one of the time periods programmed into the control module.

The accompanying drawings, which are incorporated in and constitute a part of this specification, illustrate embodiments of the invention and, together with the summary of the invention given above, and the detailed description of the drawings given below, explain the principles of the present invention.

BRIEF DESCRIPTION OF THE DRAWINGS

FIG. 11I is a front view of one face of a second additional board of the adjustable timer.

FIG. 11J is a front view of the opposite face of the second additional board of the adjustable timer.

FIG. 12 is a front perspective view of the adjustable timer of FIG. 1 without any boards in the cavity and with markers in place.

FIG. 12A is an enlarged view of the encircled area 12A of FIG. 12.

FIG. 13A is a schematic cross-sectional view taken generally along the line 13A-13A of FIG. 12.

FIG. 13B is a schematic cross-sectional view like FIG. 13A showing the top marker being secured in place.

DETAILED DESCRIPTION OF THE INVENTION

Figure 1:
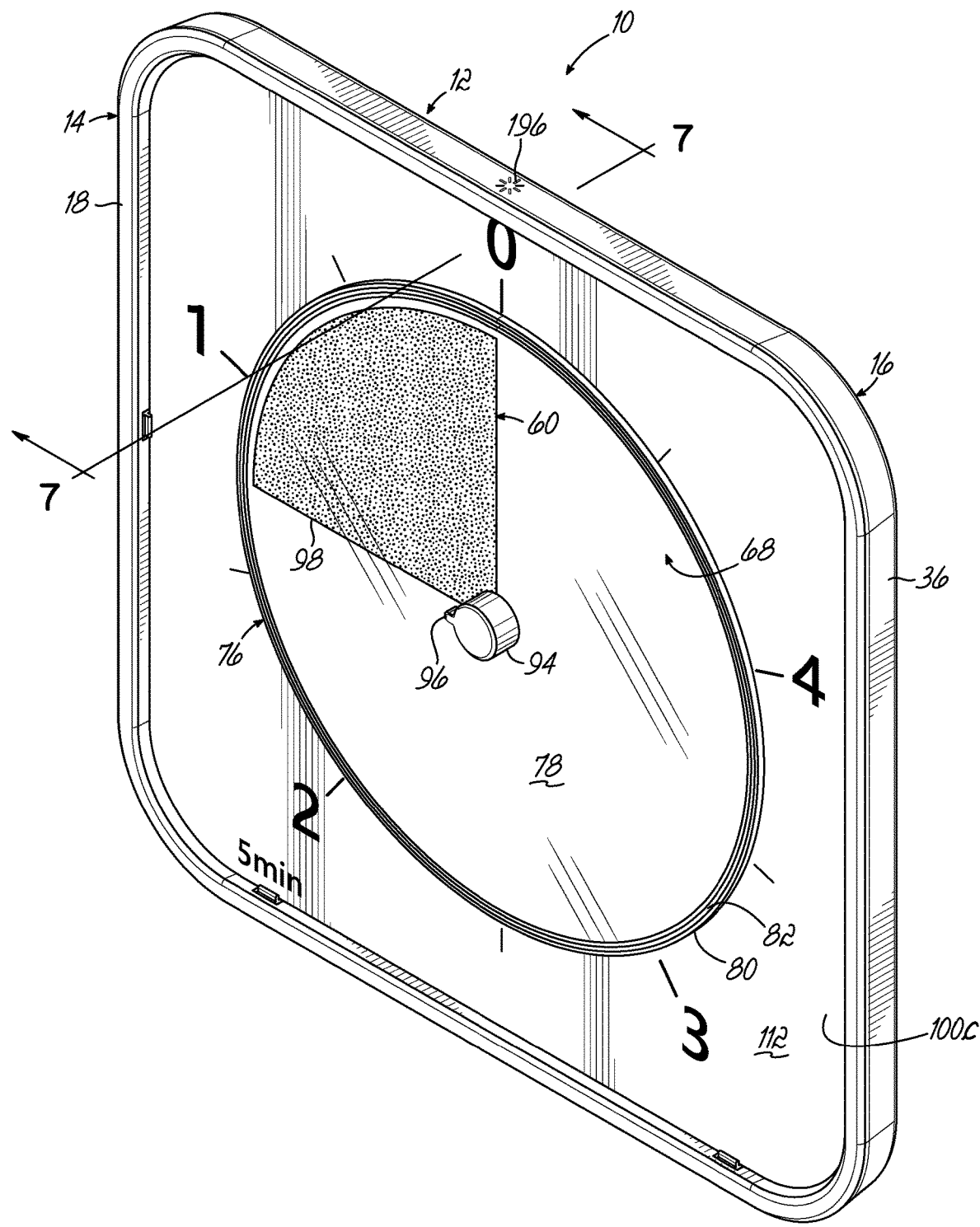
FIG. 1 is a front perspective view of an adjustable timer.
Figure 3:
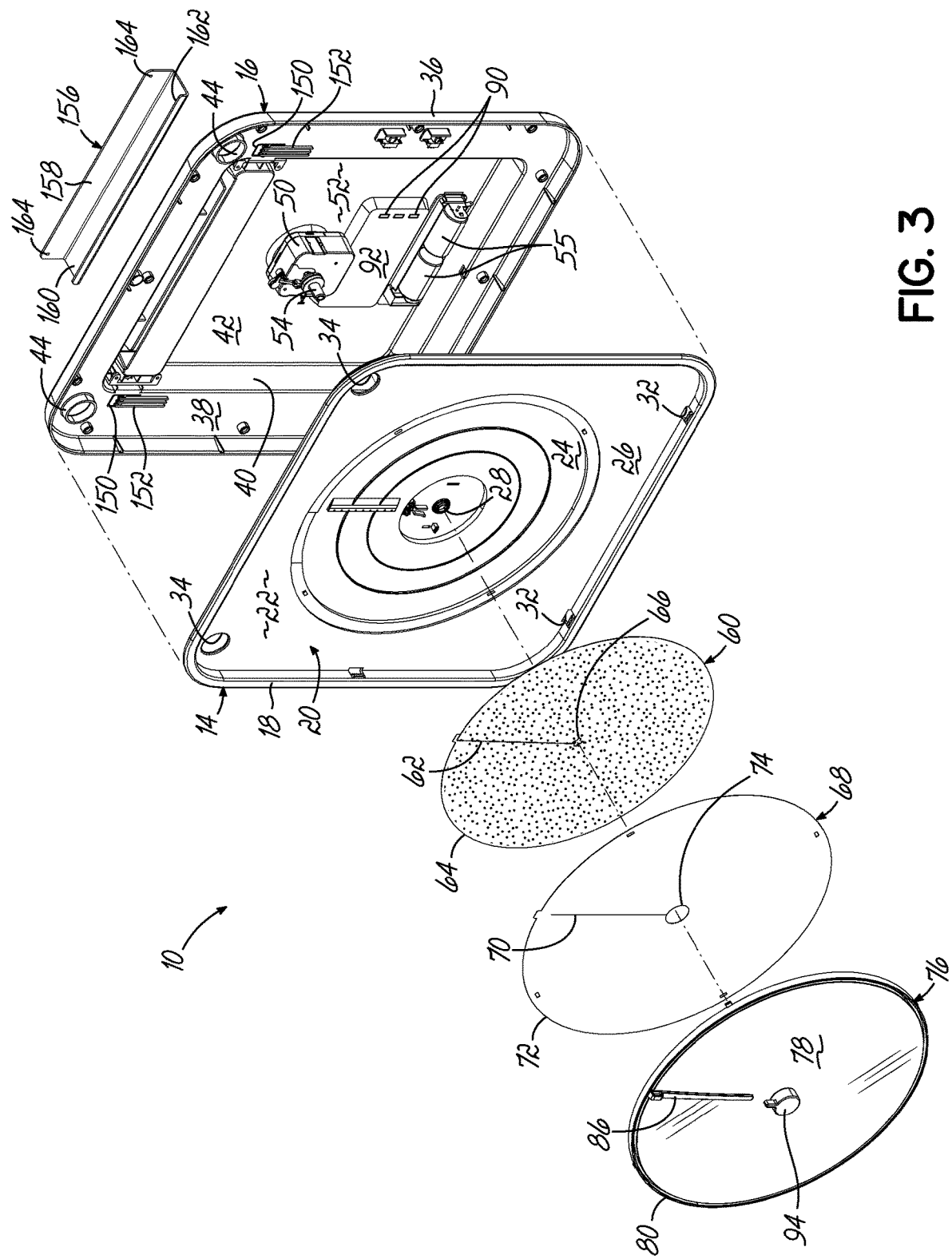
FIG. 3 is a partially disassembled view of the adjustable timer of FIG. 1.
Figure 7:
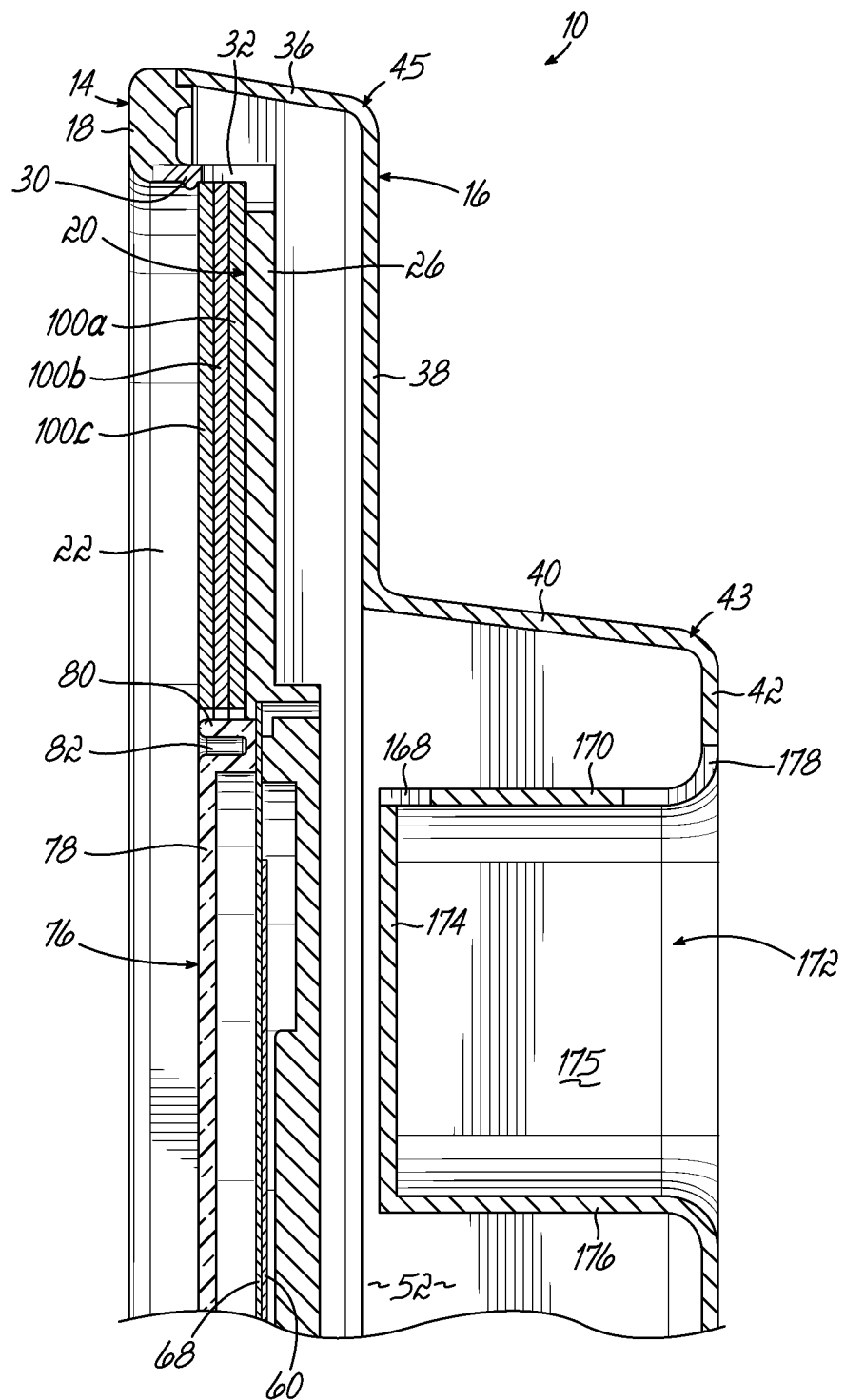
FIG. 7 is a cross-sectional view taken along the line 7-7 of FIG. 1.

Referring first to FIG. 1, there is illustrated an adjustable timer 10 incorporating the principles of the present invention. As best shown in FIG. 3, the adjustable timer 10 comprises a generally rectangular body 12 including a generally rectangular front tray 14 and a generally rectangular rear tray 16. For purposes of this document, the term "tray" is not intended to be limited by the drawings herein or any dictionary definition. As best shown in FIG. 7, when assembled, the front and rear trays 14, 16 are secured together with any convention means including fasteners.

As best shown in FIG. 3, the front tray 14 of the adjustable timer 10 is unitary molded plastic piece having a border 18 around the perimeter of a floor 20. The border 18 extends forwardly from the floor 20. The border 18 and floor 20 define a cavity 22 in which double-faced boards reside, as described below. As best shown in FIG. 3, the floor 20 has a circular recess 24 extending rearwardly from a generally planar outer portion 26. The floor 20 of the front tray 22 has an opening 28 located at the center of the circular recess 24.

As best shown in FIG. 12A, the border 18 has six biasing members 30 integrally formed therein which function to hold boards inside cavity 22 as described below. Each biasing member 30 is movable in an opening 32 in the front tray 14. Although the drawings only show three biasing members 30 (two on the bottom and one on the left of FIG. 12), the border 18 of front tray 14 has six biasing members 30, two on the top, two on the bottom and one on each side. However, any number of biasing members may be used.

As best shown in FIG. 3, towards an upper part of front tray 14 of the adjustable timer 10, two spaced openings 34 extend through the generally rectangular front tray 14 of the adjustable timer 10. Each of the openings 34 is illustrated as being circular and sized such that a person may push a finger through the opening 34. However, the openings may be any desired shape or size.

Figure 2:
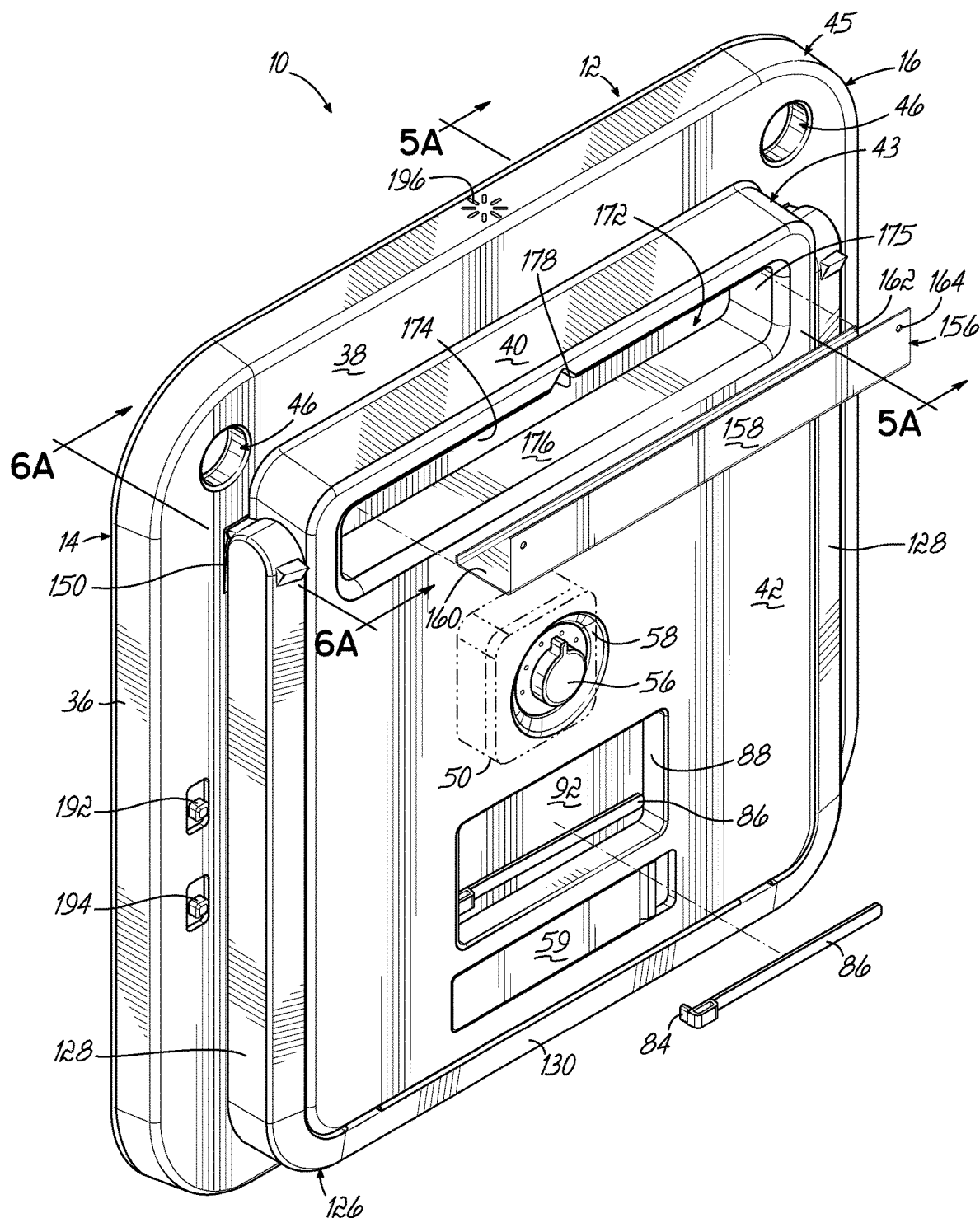
FIG. 2 is a rear perspective view of the adjustable timer of FIG. 1 showing a mounting stand in a first position.

As best shown in FIGS. 2, 3 and 7, the rear tray 16 of the adjustable timer 10 is unitary molded plastic piece having a perimeter portion 36 extending from front to rear, an intermediate panel 38 extending inwardly from the perimeter portion 36, a flange portion 40 extending from front to rear generally parallel the perimeter portion 36 and a rear panel 42. The rear panel 42 extends generally parallel the intermediate portion 38. As shown in FIG. 2, the flange portion 40 and rear panel 42 comprise a generally rectangular rear portion 43 of the body 12 smaller in size than the generally rectangular rear portion 45 of the body 12.

As best shown in FIGS. 3, 12, 13A and 13B, the rear tray 16 has two bosses 44 extending inwardly from the rear portion 42. Upon assembly, these bosses 44 align with the openings 34 in the front tray 14 to create two cylindrical passages 46 extending through the body 12 of the adjustable timer 10. These passages 46 enable a user to push the boards out of the cavity 22 of the front tray 14 from behind the timer quickly and easily to change the exposed board face of the timer. This process is illustrated by the arrows 48 shown in FIGS. 10A and 10B. Although the passages 46 are illustrated being cylindrical and sized to enable a person's finger to pass through each passage 46, the passages 46 may be any desired size and shape.

Figure 3A:
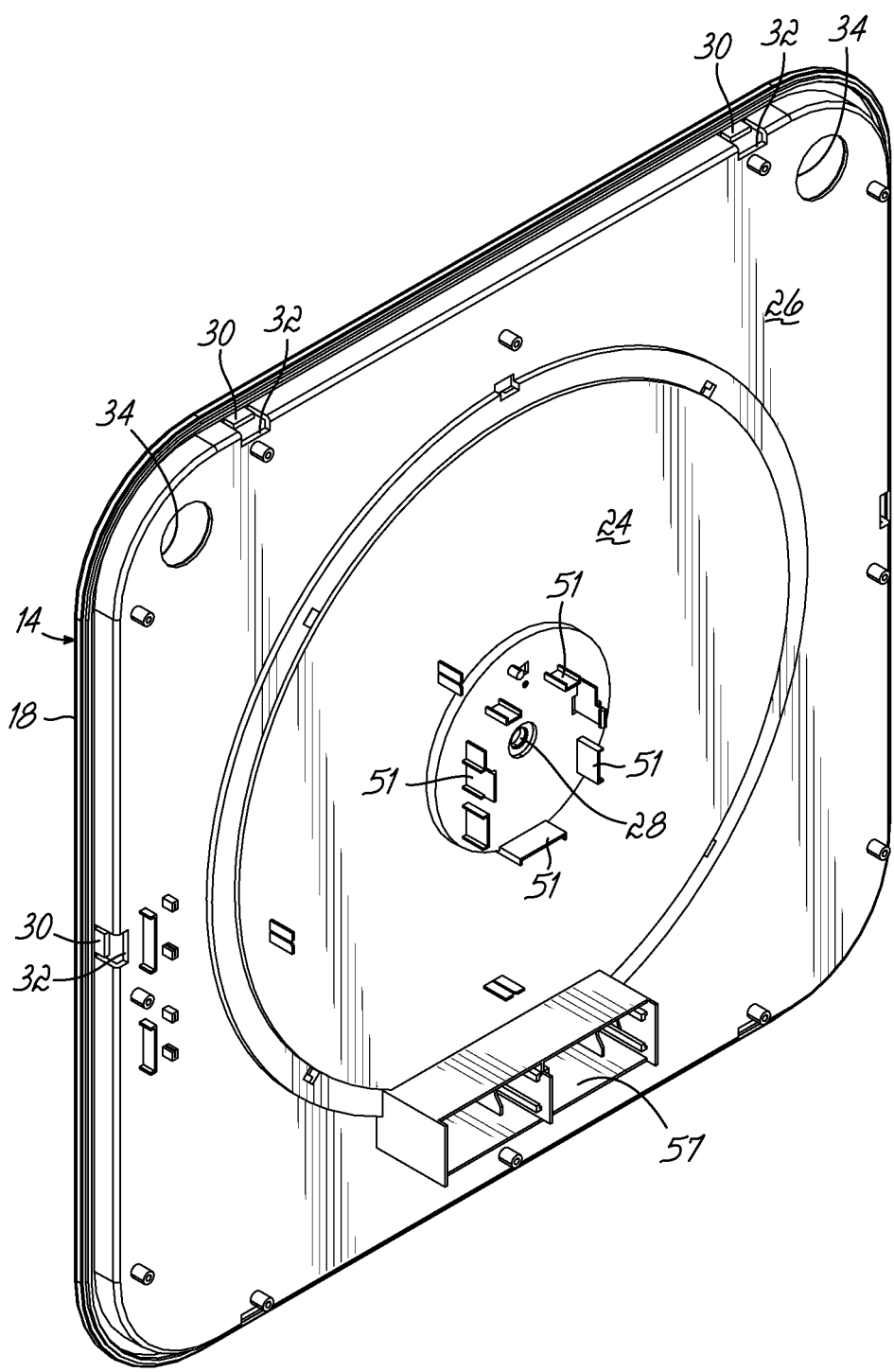
FIG. 3A is a rear perspective view of the front tray of the adjustable timer of FIG. 1.

As best shown in FIGS. 2, 3 and 3A, a control module 50 is held in a generally rectangular gap 52 formed in the rear tray 16 by tabs 51 formed in the front tray 14. The control module 50 includes a rotatable shaft 54 which rotates at a predetermined speed determined by a user rotating a knob 56 shown in FIG. 2. As best shown in FIG. 2, the knob 56 is rotatable in a recess 58 formed in the rear portion 42 of the rear tray 16 so the knob is protected, and its setting fixed by a user does not accidently get changed.

As best shown in FIG. 3, the control module 50 is powered by two batteries 55. The batteries 55 are held in a compartment 57 shown in FIG. 3A formed in the front tray 14. As best shown in FIG. 2, the compartment 57 has a door 59 which may be removed to change batteries.

As best shown in FIG. 3, a circular-shaped colored disk 60 rotates in the circular recess 24 of the floor 20 of the generally rectangular front tray 14. The colored disk 60 has a slit 62 extending inwardly from an outer edge 64 to a central opening 66. The central opening 66 is sized the rotatable shaft 54 of the control module 50 fits through the central opening 66. Because the colored disk 60 is secured to the shaft 54, they rotate at the same rate or speed. Thus, one full rotation of the rotatable shaft 54 based on the setting of the control module 50 equals one full rotation of the colored disk 60.

In front of the rotatable colored disk 60 is a background disk 68 secured to the generally rectangular front tray 14 in the circular recess 24 of the floor 20 of the generally rectangular front tray 14. The background disk 68 has a slit 70 extending inwardly from near an outer edge 72 to a central opening 74. The central opening 74 is sized to allow the rotatable shaft 54 of the control module 50 to pass through it, but is not shaped to latch onto the rotatable shaft 54. Therefore, the background disk 68 remains stationary and does not rotate with the rotatable shaft 54. The slit 70 is sized to allow a portion of the rotatable colored disk 60 to pass in front of the background disk to become visible and indicate elapsed or remaining time.

A circular lens 76 is secured to the rectangular front tray 14 and located in the circular recess 24 in front of the background disk 68. As best shown in FIGS. 13A and 13B, the circular lens 76 has a central portion 78, an outer portion 80 having a U-shaped cross-section including a slot 82 adapted to receive and retain a tab 84 of a marker 86. One or more markers 86 may be placed at any desired location outside the circular lens 76 to indicate to a user that it is time for an event or the time when the timer began. In other words, the markers 86 may be used to indicate any designated time. FIG. 3 illustrates one marker 86 secured to the circular lens 76. As best shown in FIG. 2, when not in use, any number of markers 86 are secured in a generally rectangular recess 88 in the rear tray 16. FIG. 3 shows the recess 88 from the front of the timer. The tabs 84 of the markers 86 friction fit into slots 90 in a rear wall 92 of recess 88 to secure the markers 86 in recess 88.

Figure 4:
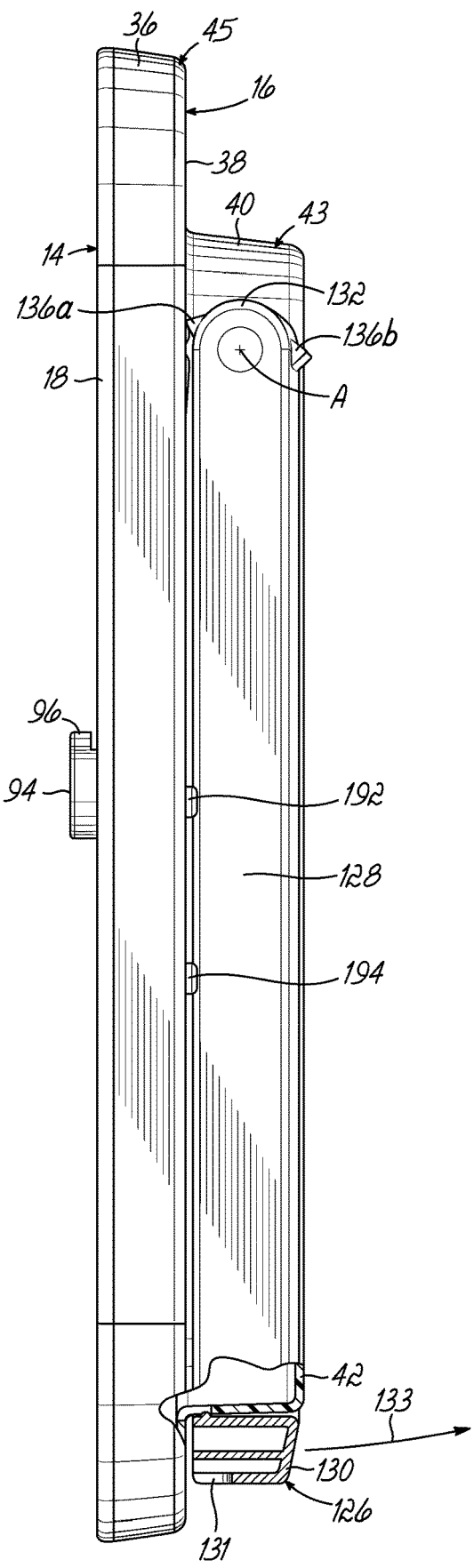
FIG. 4 is a side elevational view, partially broken away, of the adjustable timer of FIG. 1 showing the mounting stand in a first position.

Another component of the adjustable timer 10 is a positioner 94 secured to the shaft 54 of the control module 50. By rotating the positioner 94 manually in a direction opposite to the direction of rotation of the shaft 54 and colored disk 60, a user may set the time to elapse. In the embodiment illustrated, the shaft 54 is rotated in a clockwise direction by the control module 50 and the positioner 94 may be manually rotated by a user in a counterclockwise direction. As best shown in FIGS. 1 and 4C, the positioner 94 has a pointer 96 which points to the traveling edge 98 of the colored disk 60. The positioner 94 rotates with the colored disk 60, the pointer 96 of the positioner 94 constantly traveling with the traveling edge 98 of the colored disk 60.

Figure 9:
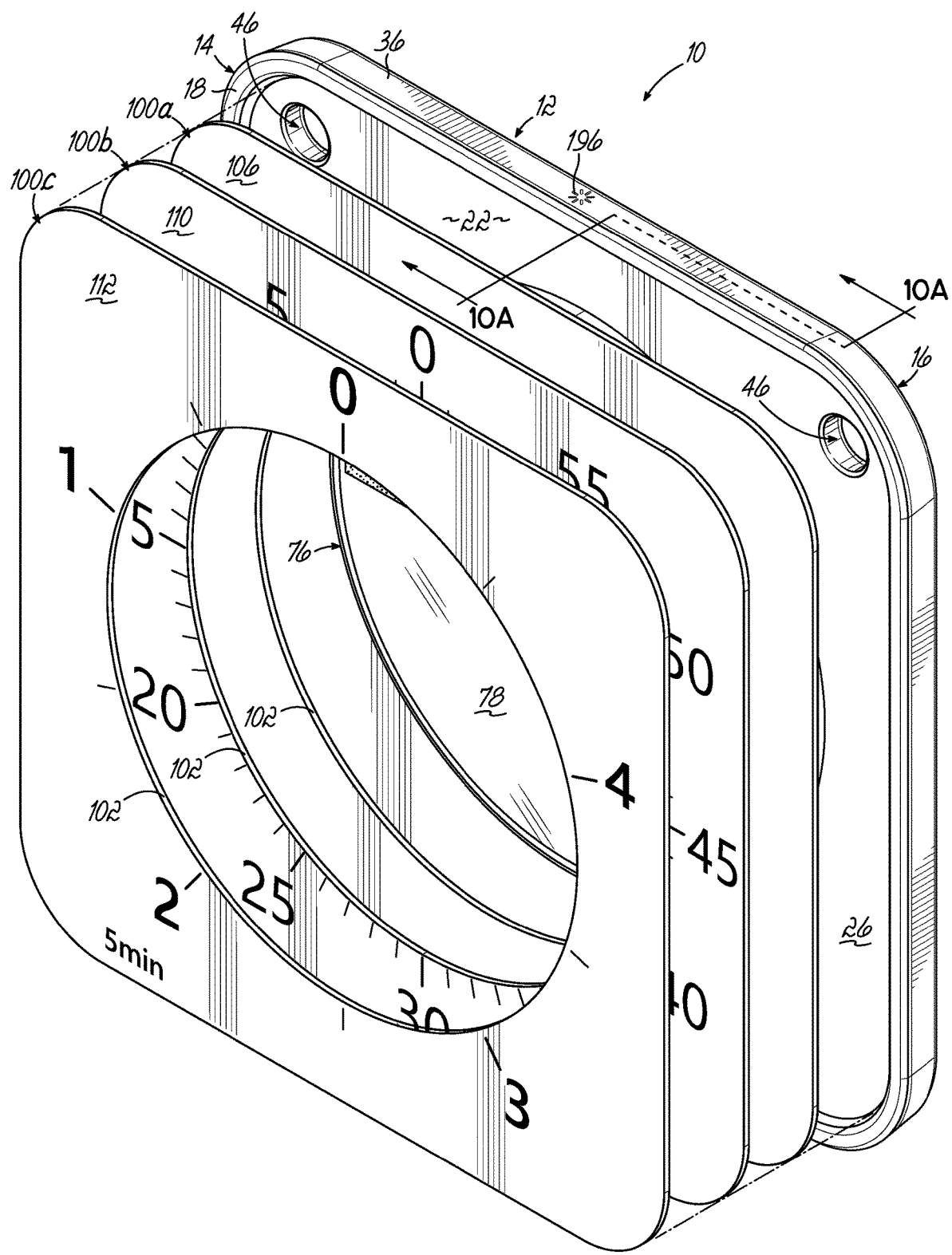
FIG. 9 is a front perspective view of the adjustable timer showing the three boards spaced from each other in front of the timer.
Figure 10A:
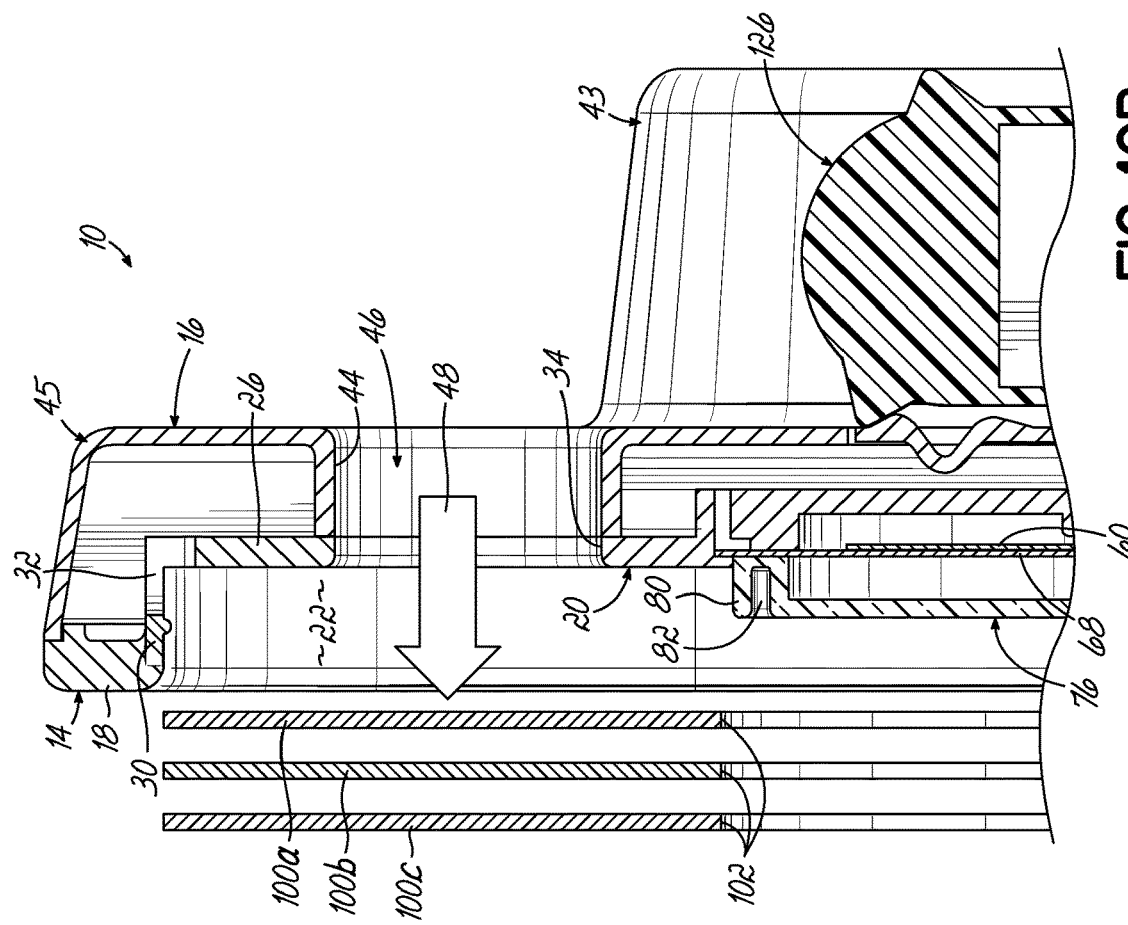
FIG. 10A is a schematic cross-sectional view taken generally along the line 10A-10A of FIG. 9.
Figure 10B:
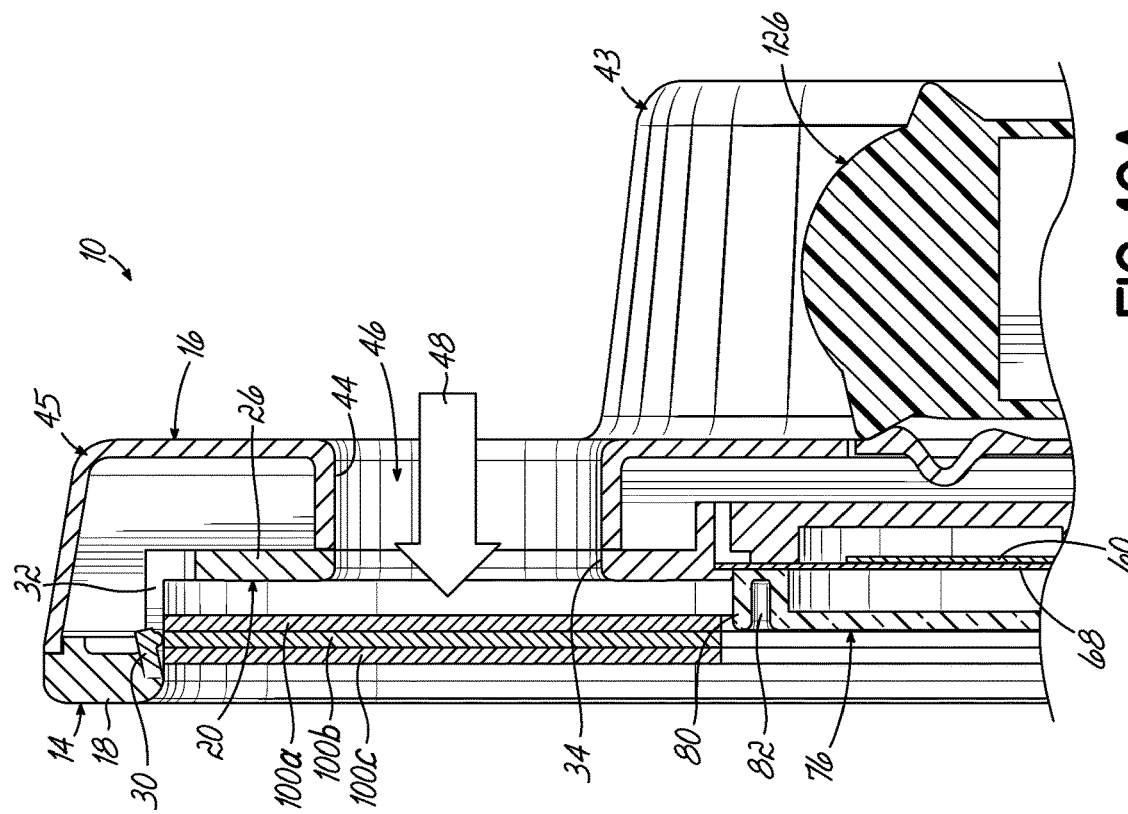
FIG. 10B is a schematic cross-sectional view like FIG. 10A showing the three boards being pushed out of the cavity of the adjustable timer.

As best shown in FIGS. 9, 10A and 10B, three boards 100a, 100b and 100c reside in the cavity 22 of the front tray 14 of the body 12 of adjustable timer 10. Two additional boards 100d and 100e, shown in detail in FIGS. 11G-11J, may be sold separately. The adjustable timer 10 may be sold with any number of boards in the cavity 22 of the front tray 14 of the body 12 of adjustable timer 10. The boards residing in the cavity 22 of the front tray 14 of the body 12 of adjustable timer 10 are not intended to be limited by the drawings. Any board displaying any desired time period on either board face may be incorporated into the adjustable timer as long as the control module is programed such that one full rotation of the shaft and colored disk occurs in the indicated time period on the board face.

Each of the boards 100a-100e is generally rectangular and has a circular cutout 102 through which the lens 76 passes. The boards may be made of any desired material. One or more faces of one or more boards may be capable of being written upon, like a dry erase board.

Figure 11A:
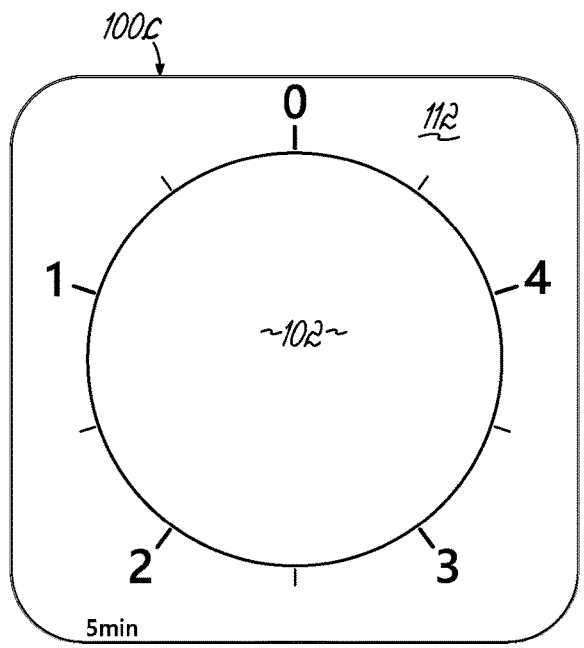
FIG. 11A is a front view of one face of a first board of the adjustable timer.
Figure 11B:
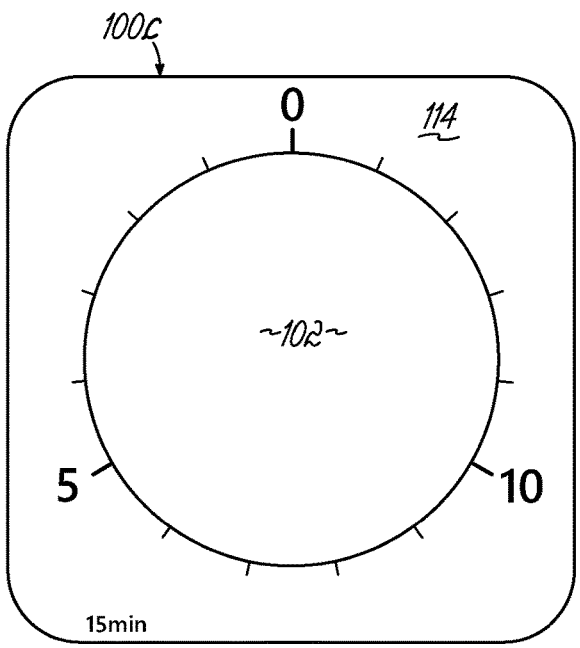
FIG. 11B is a front view of the opposite face of the first board of the adjustable timer.
Figure 11C:
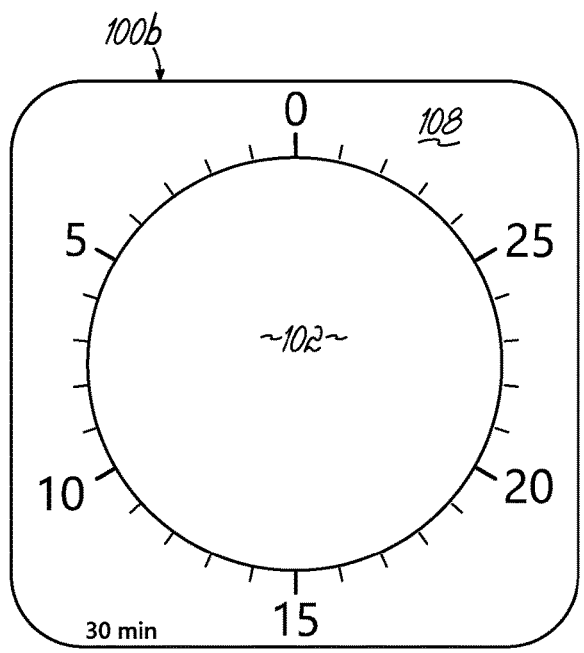
FIG. 11C is a front view of one face of a second board of the adjustable timer.
Figure 11D:
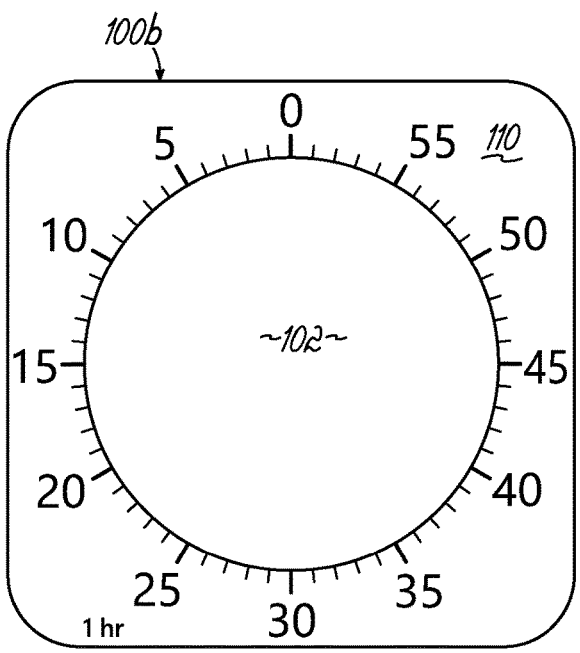
FIG. 11D is a front view of the opposite face of the second board of the adjustable timer.
Figure 11E:
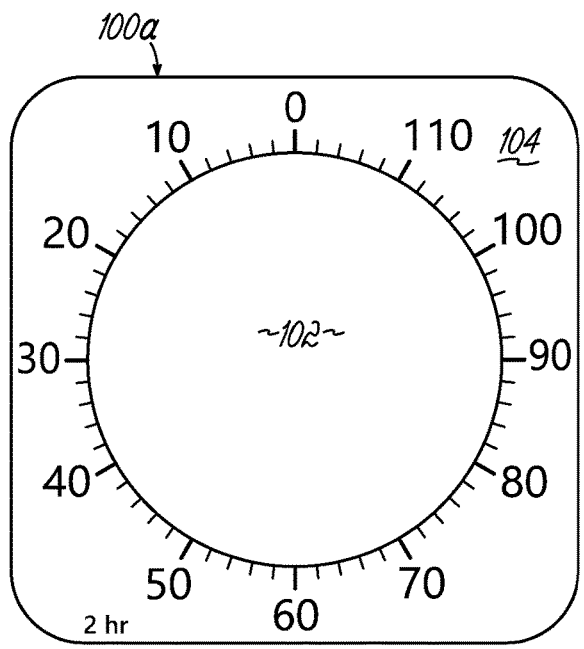
FIG. 11E is a front view of one face of a third board of the adjustable timer.
Figure 11F:
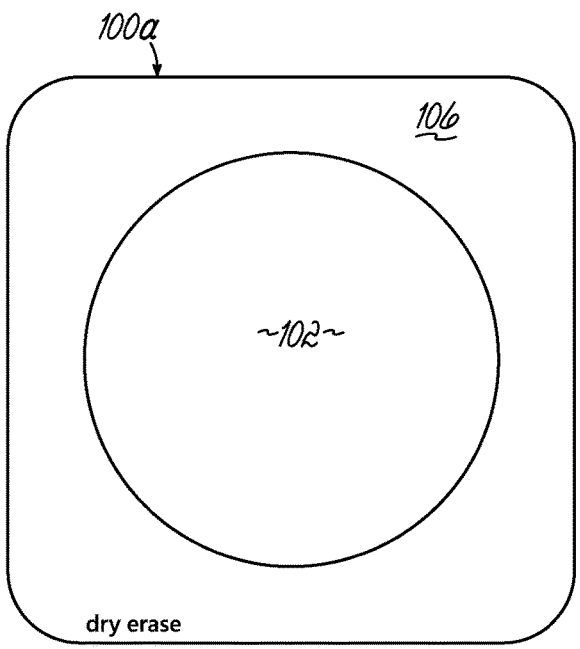
FIG. 11F is a front view of the opposite face of the third board of the adjustable timer.

As best shown in FIGS. 9, 10A and 10B, board 100a is shown closest to the generally planar outer portion 26 of the floor 20 of the front tray 14 of the adjustable timer 10. As shown in FIG. 11E, board 100a has a first face 104 with numerical indicia indicating a two-hour time period. The numerical indicia are shown in ten-minute increments and decrease in a clockwise direction. Board 100a has a second face 106 which is blank, as shown in FIG. 11F. This blank second face 106 may be written upon or a user may put stickers thereon to indicate a time when an event should occur.

As best shown in FIGS. 9, 10A and 10B, board 100b is shown between boards 100a and 100c. Board 100b has a first face 108 with numerical indicia indicating a thirty-minute time period. The numerical indicia are shown in five-minute increments and decrease in a clockwise direction, as shown in FIG. 11E. Board 100b has a second face 110 with numerical indicia indicating a one-hour time period. The numerical indicia are shown in five-minute increments and decrease in a clockwise direction.

As best shown in FIGS. 9, 10A and 10B, board 100c is shown being in front of boards 100a and 100b. Board 100c has a first face 112 with numerical indicia indicating a five-minute time period. The numerical indicia are shown in minute increments and decrease in a clockwise direction, as shown in FIG. 11A. Board 100c has a second face 114 with numerical indicia indicating a fifteen-minute time period. The numerical indicia are shown in five-minute increments and decrease in a clockwise direction.

Figure 11G:
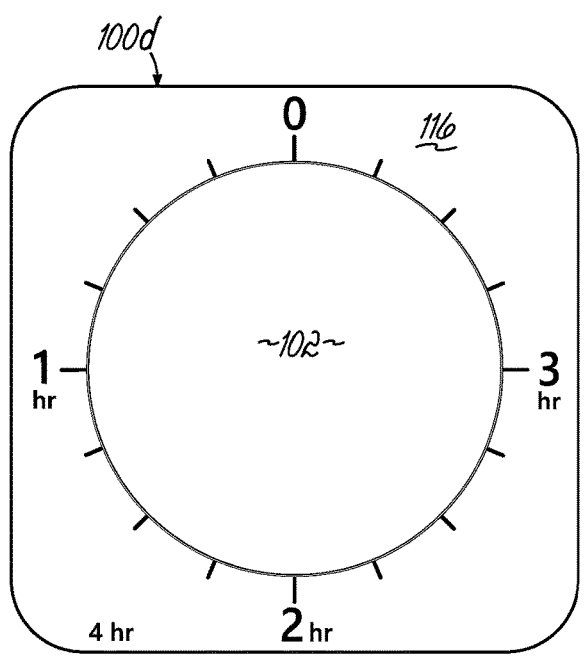
FIG. 11G is a front view of one face of a first additional board of the adjustable timer.
Figure 11H:
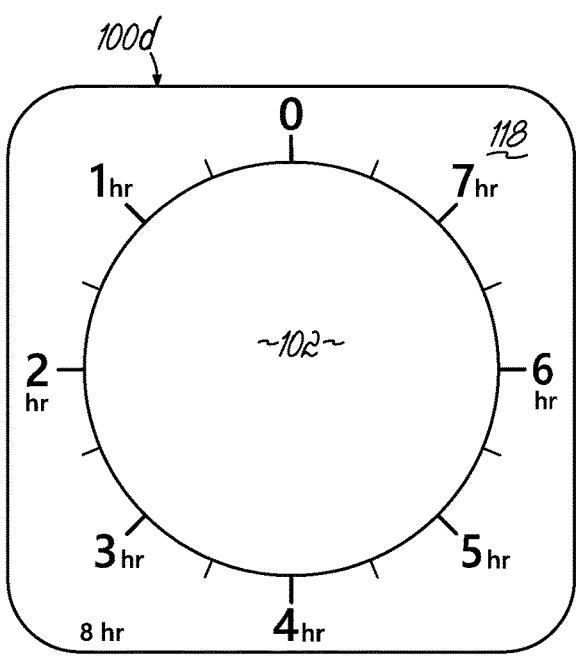
FIG. 11H is a front view of the opposite face of the first additional board of the adjustable timer.

As best shown in FIGS. 11G and 11H, board 100d has a first face 116 with numerical indicia indicating a four-hour time period. The numerical indicia are shown in one-hour increments and decrease in a clockwise direction, as shown in FIG. 11G. Board 100d has a second face 118 with numerical indicia indicating an eight-hour time period. The numerical indicia are shown in one-hour increments and decrease in a clockwise direction.

As best shown in FIGS. 11I and 11J, board 100e has a first face 120 with numerical indicia indicating a twenty-four-hour time period. The numerical indicia are shown in one-hour increments and decrease in a clockwise direction, as shown in FIG. 11I. Board 100e has a second face 122 which is blank, as shown in FIG. 11J. This blank second face 122 may be written upon or a user may put stickers thereon to indicate a time when an event should occur.

Although the drawings show first face 112 of board 100c being the visible board face, any of the faces of any of the boards may be the visible face. However, a user must ensure that the control module 50 is set to the proper setting using the knob 56 shown in FIG. 2 so that one full rotation of the shaft and colored disk occurs in the full time period shown on the exposed face of the front board.

Figure 14:
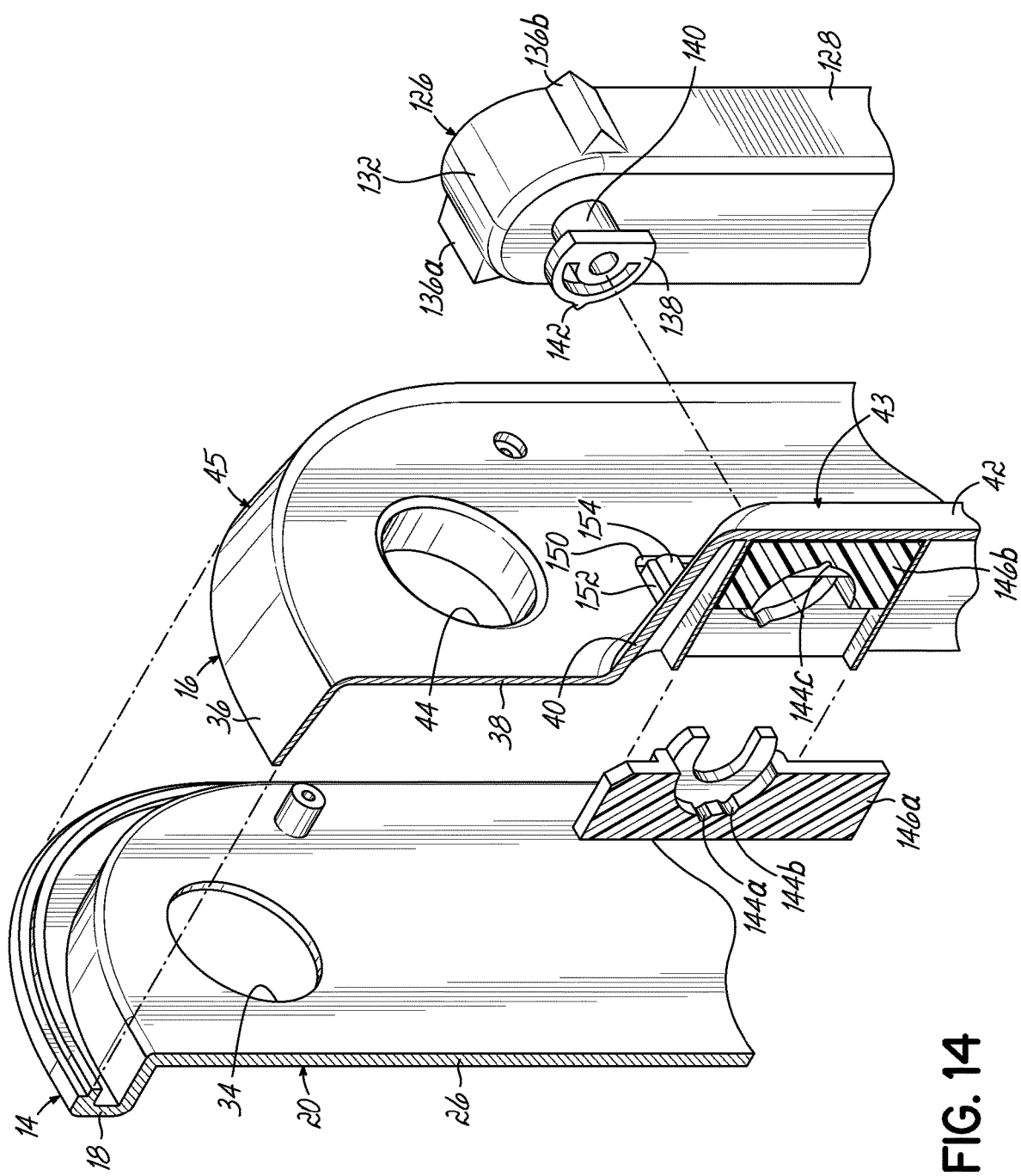
FIG. 14 is a partially disassembled view the mounting stand and the structure used to secure it in three different positions.

The adjustable timer 10 may be hung from a wall 124 in several manners or may be supported by a supporting surface such as a desk using a generally U-shaped mounting stand 126. The mounting stand 126 comprises two side portions 128 and a bottom portion 130. As best shown in FIG. 4, the bottom portion 130 may have a recess 131 which assist a person to grasp the bottom portion 130 and move the mounting stand 126 outward from its first position as indicated by arrow 133 in FIG. 4. As best shown in FIG. 14, each of the side portions 128 is pivotally joined to the body 12 and more particularly, to the rear tray 16 of body 12 (only one being shown) to pivot about a pivot axis A shown in FIG. 4. As shown in FIGS. 13A, 13B and 14, each of the side portions 128 (only one being shown) has a solid upper portion 132 and a hollow interior 134. As best shown in FIG. 14, each solid upper portion 132 has two protrusions 136a, 136b (only one being shown). As shown in FIG. 14, each of the side portions 128 (only one being shown) has a head 138 and a neck 140. The head 138 has a rib 142 adapted to fit into one of three recesses 144a, 144b and 144c formed in plates 146a, 146b, as shown in FIG. 14.

Figure 5C:
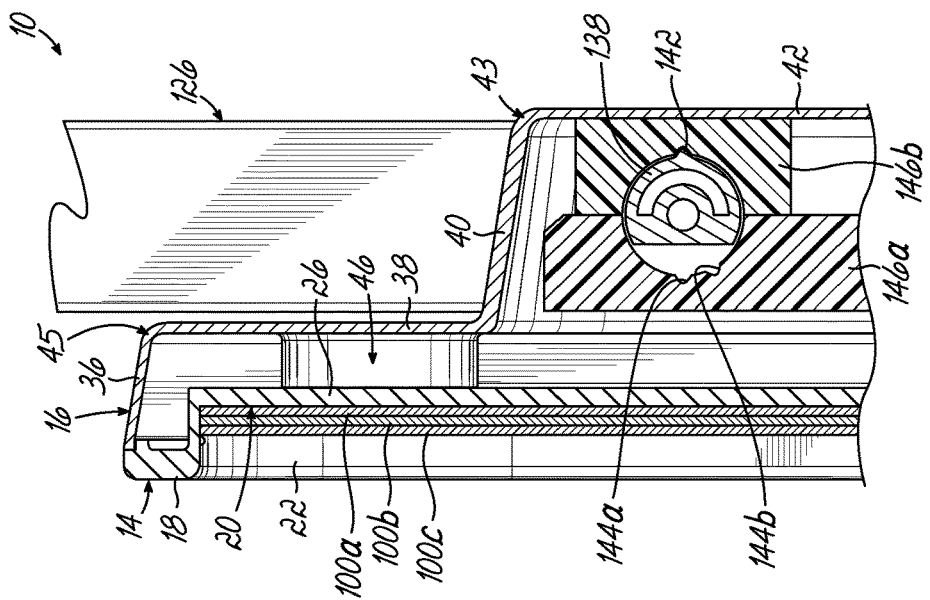
FIG. 5C is a cross-sectional view like FIG. 5A showing the mounting stand in its third position.
Figure 5B:
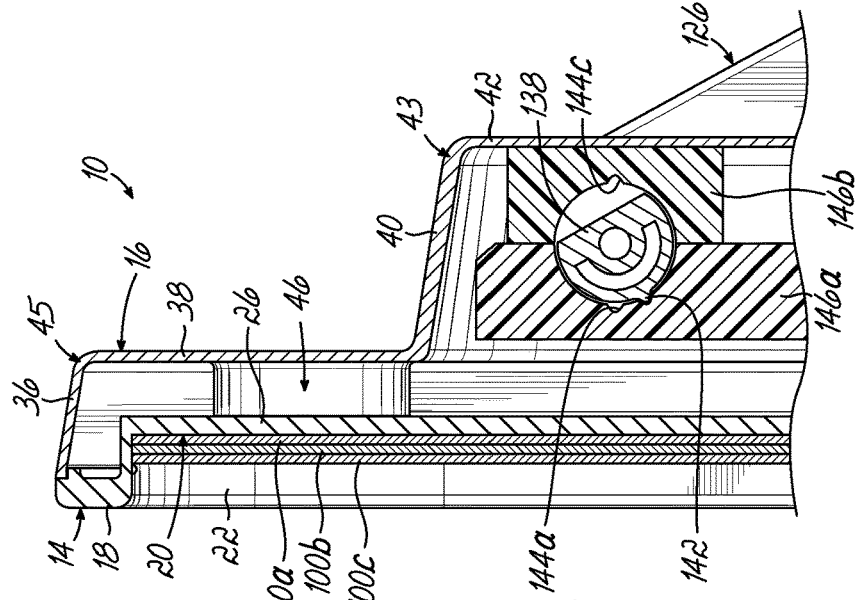
FIG. 5B is a cross-sectional view like FIG. 5A showing the mounting stand being moved to its second position.
Figure 5A:
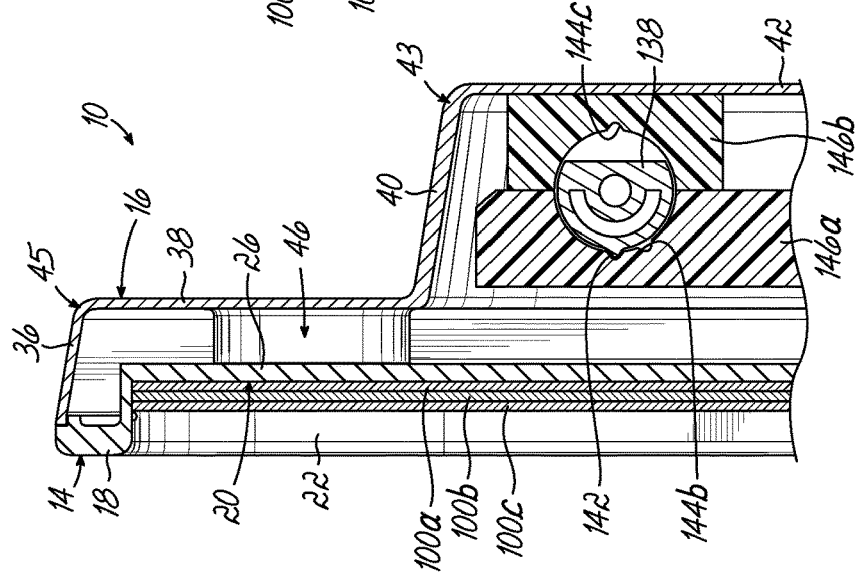
FIG. 5A is a cross-sectional view taken along the line 5A-5A of FIG. 2.
Figure 6A:
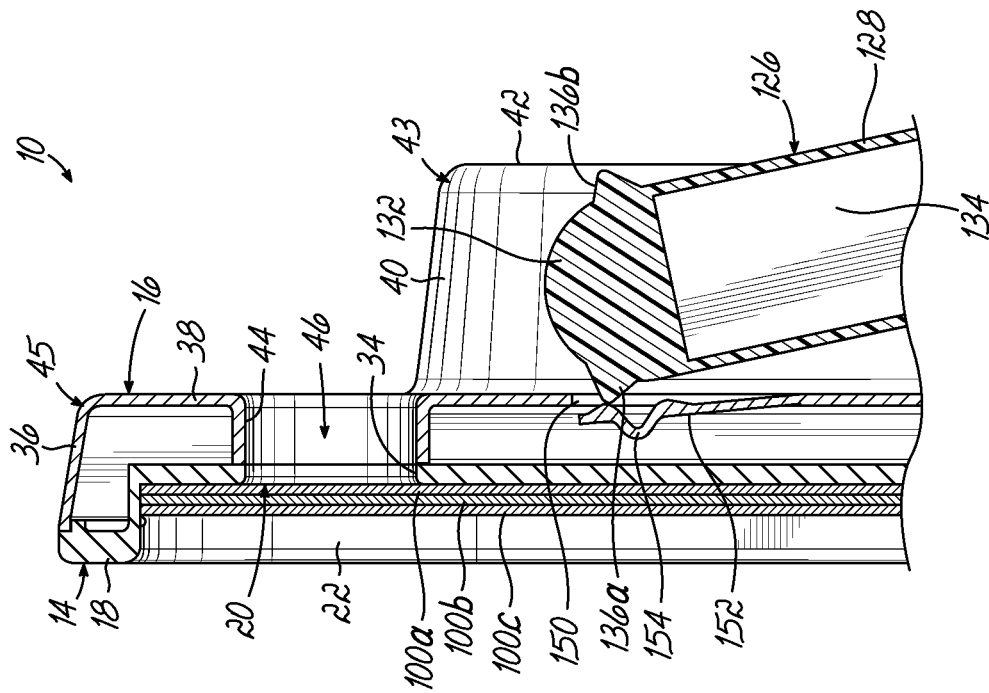
FIG. 6A is a cross-sectional view taken along the line 6A-6A of FIG. 2.
Figure 6B:
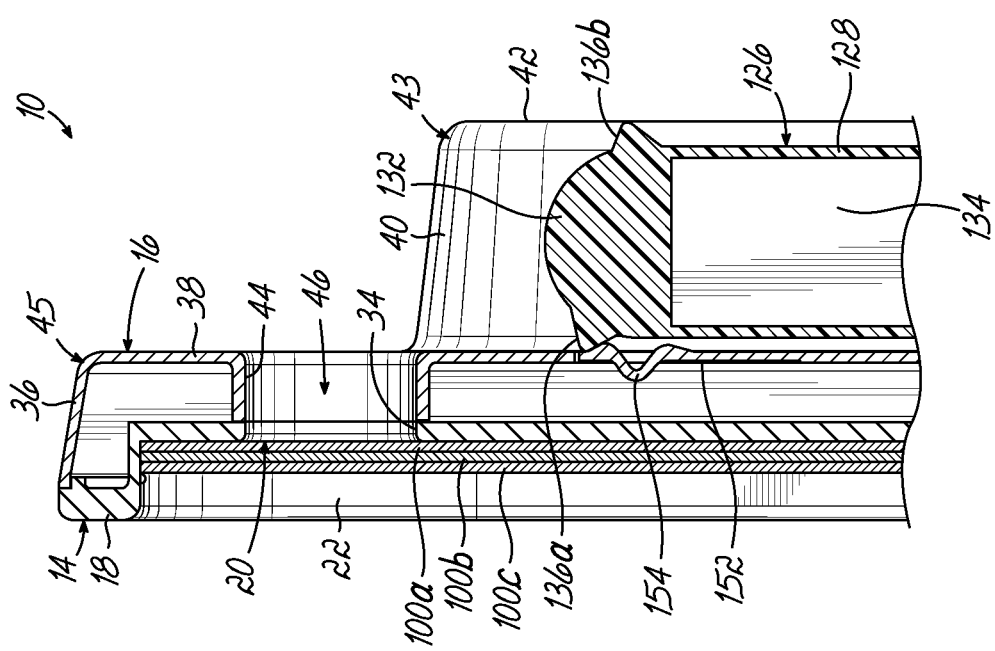
FIG. 6B is a cross-sectional view like FIG. 6A showing the mounting stand being moved to its second position.
Figure 6D:
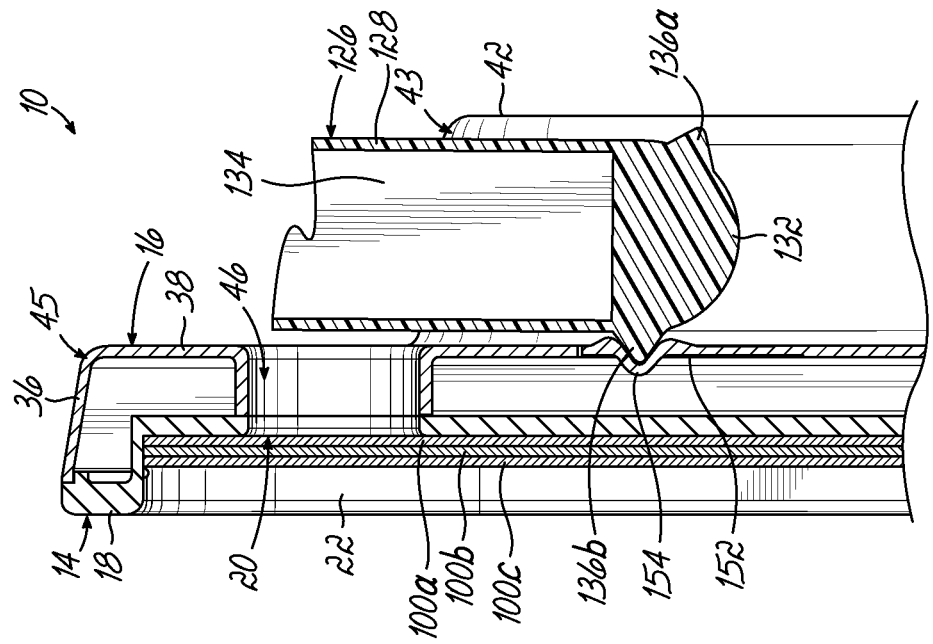
FIG. 6D is a cross-sectional view like FIG. 6A showing the mounting stand in its third position.
Figure 6C:
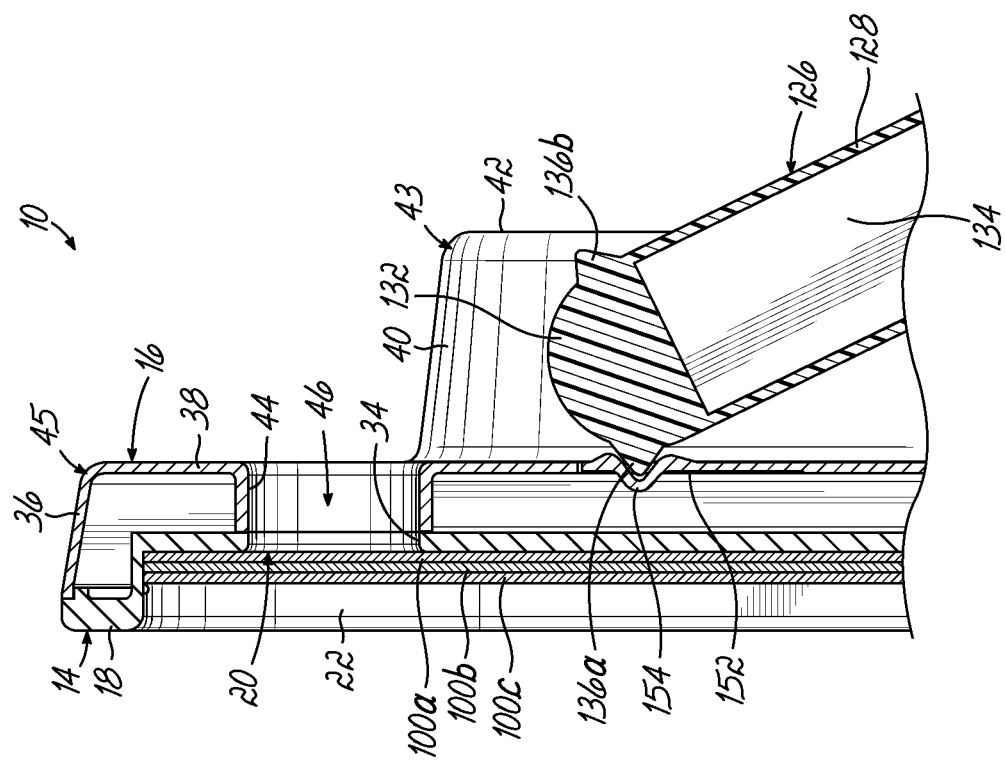
FIG. 6C is a cross-sectional view like FIG. 6A showing the mounting stand in its second position.

The mounting stand 126 may be locked in one of three positions: a first position, a second position and a third position. The first position is shown in FIGS. 2, 4, 5A and 6A in which the side portions 128 of the mounting stand 126 are parallel the body 12 of the adjustable timer 10 and outside the flange portion 40 of the rear tray 16 of the adjustable timer 10. Referring to FIGS. 5A and 14, when the mounting stand 126 is locked in the first position, the rib 142 of the head 138 is in a first recess 144a formed in plate 146a.

Figure 4A:
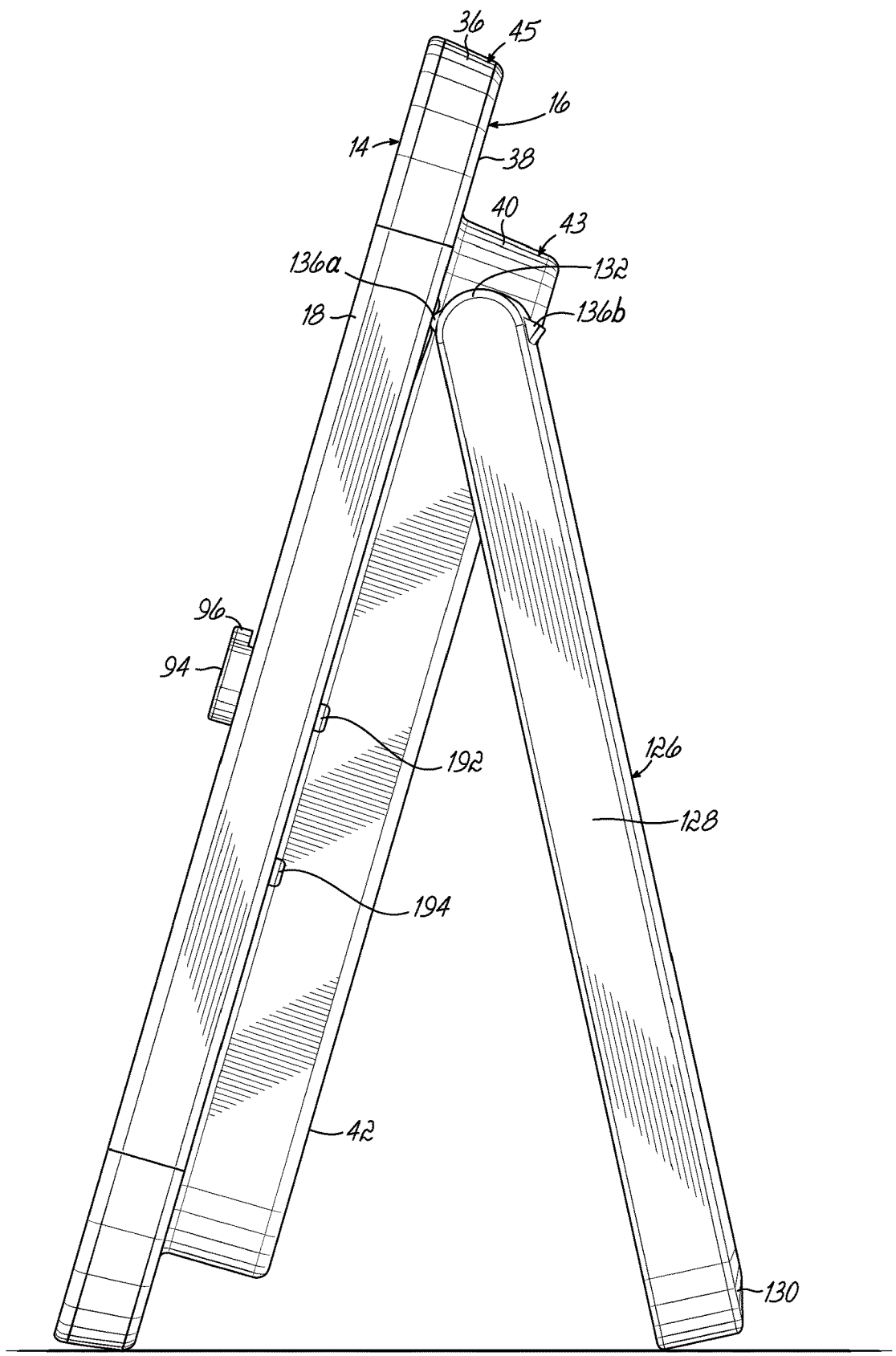
FIG. 4A is a side elevational view of the adjustable timer of FIG. 1 showing the mounting stand in a second position.

FIG. 4A shows the mounting stand 126 in its second position. As best shown in FIG. 5B, when the mounting stand 126 is locked in the second position, the rib 142 of the head 138 is in a second recess 144b formed in plate 146a. In its second position, the side portions 128 of the mounting stand 126 are at an acute angle relative to the body 12 of the adjustable timer 10.

Figure 4B:
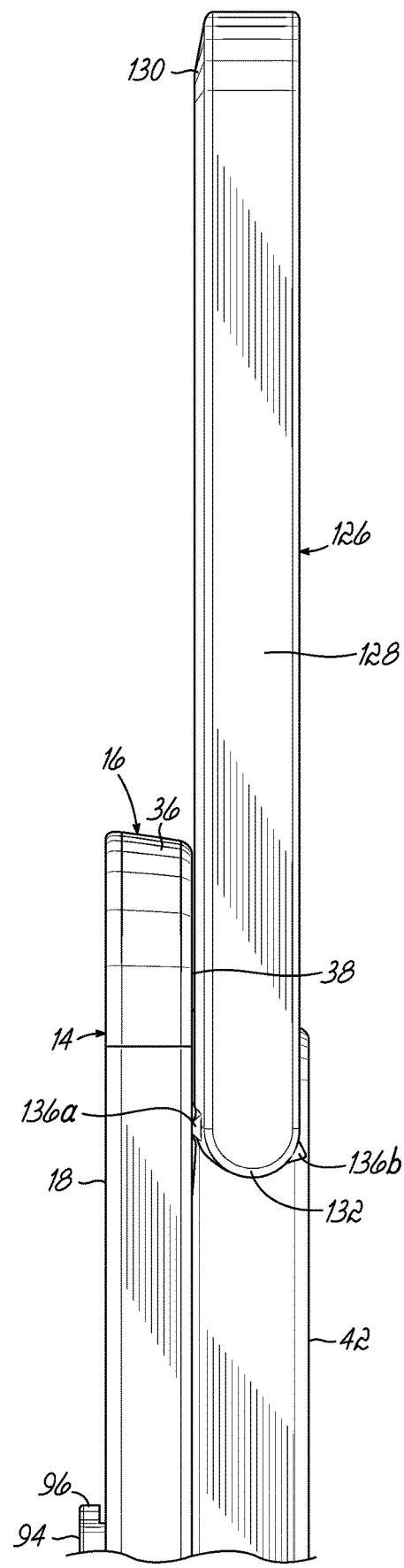
FIG. 4B is a side elevational view of the adjustable timer of FIG. 1 showing the mounting stand in a third position.
Figure 4C:
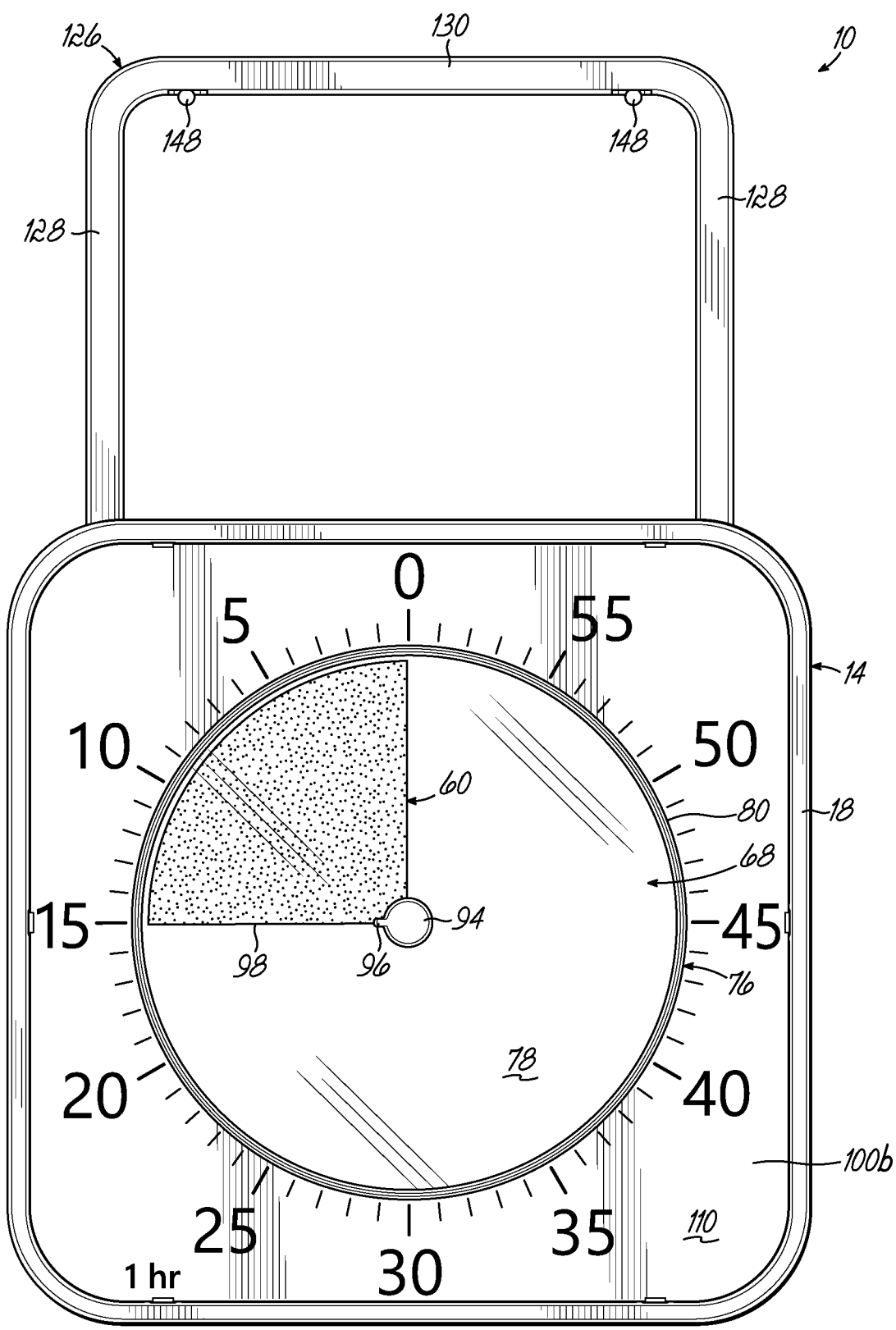
FIG. 4C is a front view of the adjustable timer of FIG. 1 with a different face exposed showing the mounting stand in the third position.

FIGS. 4B and 4C show the mounting stand 126 in its third position. As best shown in FIG. 5C, when the mounting stand 126 is locked in the third position, the rib 142 of the head 138 is in a third recess 144c formed in plate 146b. In its third position, the mounting stand 126 is generally above the body 12 of the adjustable timer 10. As shown in FIG. 4C, when the mounting stand 126 is locked in the third position, the mounting stand 126 may be hung from supports 148 such as screws, for example.

As best shown in FIGS. 2, 3 and 14, the intermediate portion 38 of the rear tray 16 of the adjustable timer 10 has two U-shaped cuts 150, one on each side of rear portion 43 of the body 12. The portion of the intermediate panel 38 of the rear tray 16 inside each of the U-shaped cuts 150 comprises a tab 152 which has a bump 154 adapted to receive and retain one of the protrusions 136a, 136b of each of the side portions 128 of the mounting stand 126, depending upon the position of the mounting stand 126. When the mounting stand 126 is in its first position, the protrusions 136a of the mounting stand 126 are engaged with the bumps 154 of tabs 152 of the intermediate panel 38 of the rear tray 16 to keep the mounting stand 126 in its first position. See FIGS. 6A-6D. When the mounting stand 126 is in its third position, the protrusions 136b of the mounting stand 126 are engaged with the bumps 154 of tabs 152 of the intermediate panel 38 of the rear tray 16 to keep the mounting stand 126 in its third position.

Figure 8A:
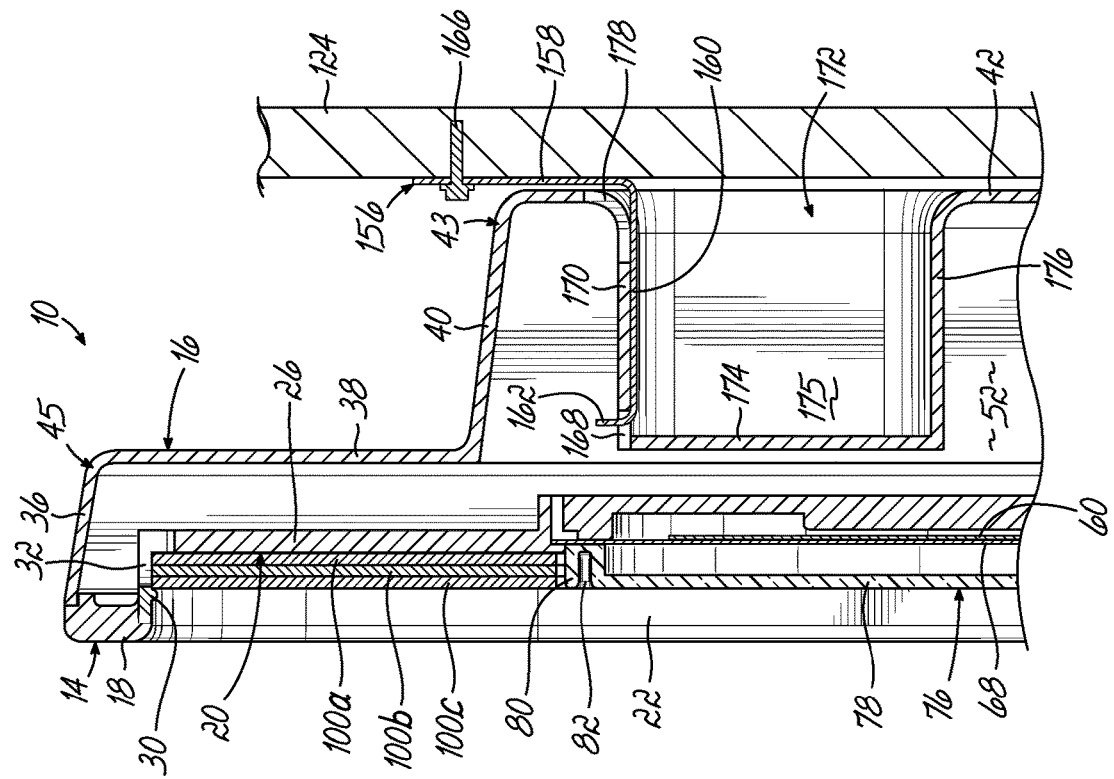
FIG. 8A is a cross-sectional view like FIG. 7 showing the adjustable timer hanging from a fastener secured into a wall.
Figure 8B:
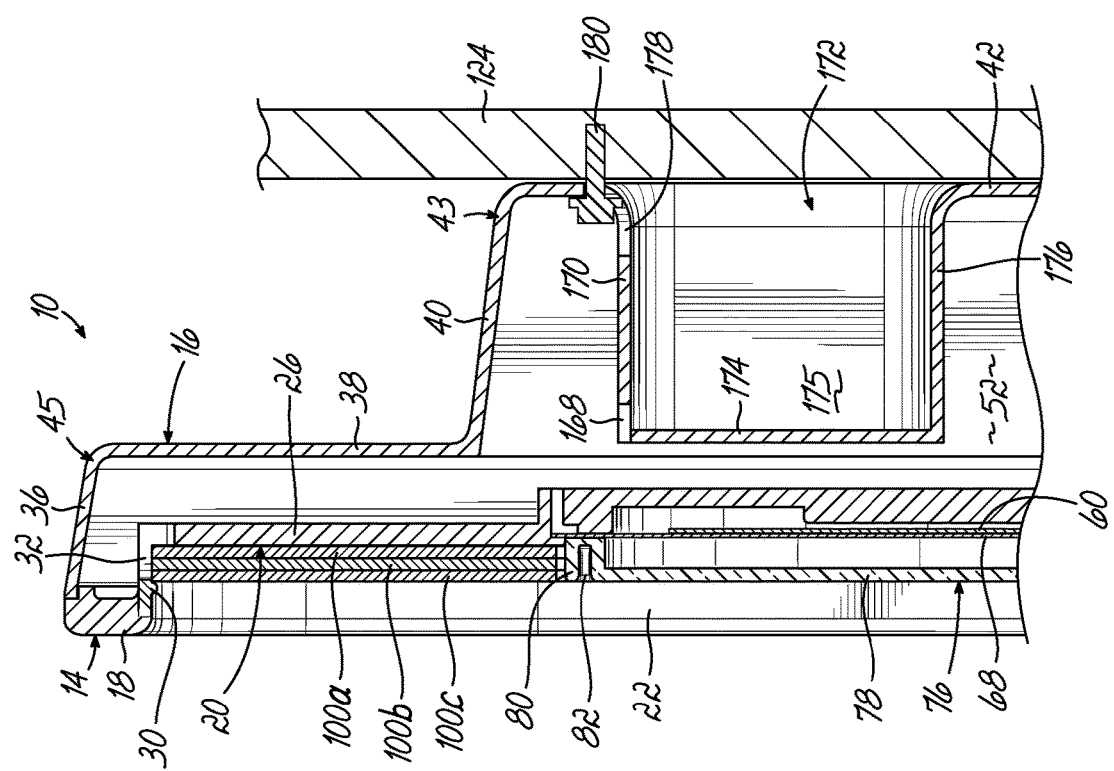
FIG. 8B is a cross-sectional view like FIG. 7 showing a wall mount securing the adjustable timer to a wall.

The adjustable timer 10 may be sold with a wall mount 156. The wall mount 156 comprises a rear wall 158, a floor 160 and a front lip 162. The rear wall 158 has two openings 164 for mounting the rear wall 158 of wall mount 156 to a wall 124 with two fasteners 166 (only one being shown in FIG. 8B). As shown in FIG. 8B, the front lip 162 passes through an opening 168 in an upper wall 170 of a recess 172 formed in the rear portion 43 of the body 12. As best shown in FIGS. 2, 7, 8A and 8B, the recess 172 is generally rectangular and has a front wall 174, opposed side walls 175 and a bottom wall 176. As shown in FIGS. 2 and 8A, an opening 178 formed in the upper wall 170 of recess 172 may receive a fastener 180 for mounting the adjustable timer 10 to a wall 124.

Figure 8D:
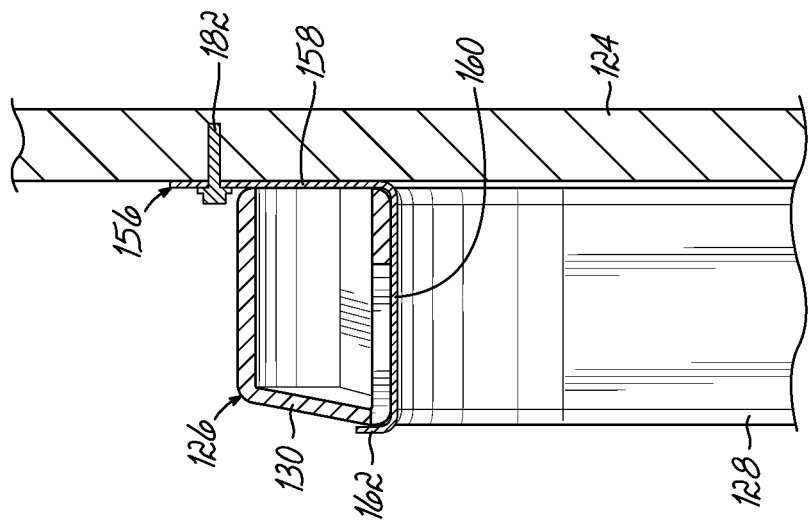
FIG. 8D is a cross-sectional view like FIG. 7 showing the wall mount secured with fasteners into a wall and the mounting stand of the adjustable timer hanging from the wall mount.

FIG. 8D illustrates another way of mounting the adjustable timer 10 to a wall 124 using wall mount 156. As shown in FIG. 8D, the wall mount 156 supports the bottom portion 130 of the mounting stand 126. The mounting stand 126 in its third position generally above the body 12 of the adjustable timer 10. More particularly, the front lip 162 of wall mount 156 is in front of the bottom portion 130 of the mounting stand 126. The floor 160 of wall mount 156 passes underneath the bottom portion 130 of the mounting stand 126. Fasteners 182 (only one being shown in FIG. 8D) extending through openings 162 in the rear wall 158 of wall mount 156 to secure the wall mount 156 to the wall 124.

Figure 8C:
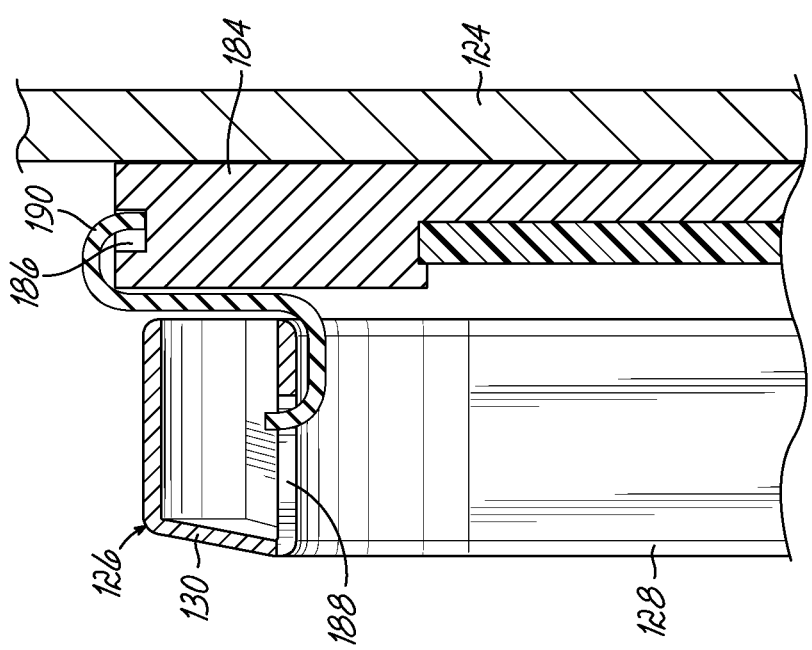
FIG. 8C is a cross-sectional view like FIG. 7 showing the adjustable timer hanging from the timer's mounting stand with "S-shaped" fasteners.

FIG. 8C illustrates another way of mounting the adjustable timer 10 to a wall 124. Like FIG. 8D, the mounting stand 126 in its third position generally above the body 12 of the adjustable timer 10. FIG. 8C illustrates a dry erase board holder 184 has a groove 186 extending along the top of the dry erase board holder 184. As shown in FIGS. 4C and 8C, the bottom portion 130 of the mounting stand 126 has two openings 188 (only one being shown in FIG. 8C). S-shaped hooks 190 (only one being shown in FIG. 8C) extend through openings 188 and into upper openings 186 of dry erase board holder 184 (only one being shown in FIG. 8C).

As shown in FIG. 2, the adjustable timer 10 has two switches, an upper switch 192 and a lower switch 194 each connected to the control module 50. One of the switches is a three-position switch for off, low or high volume of a speaker 196. The other switch is a two-position switch to enable or disable a five-minute audible pre-alert prior to the end of the time period. This second switch may be programmed to indicate when a predetermined time remains and may be turned on only when certain board faces are exposed and when the control module is set to match the exposed board face.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the faces of the boards may show different time periods than those illustrated. The invention resides in each individual feature described herein, alone, and in all combinations of any and all of those features. Accordingly, the scope of the invention shall be limited only by the following claims and their equivalents.

What is claimed is:

1. An apparatus for displaying remaining and elapsed time comprising:
   a generally rectangular body comprising a generally rectangular front tray and a generally rectangular rear tray secured to the generally rectangular front tray, the generally rectangular front tray having a circular recess, the generally rectangular body having a battery compartment for storing at least one battery;
   a control module located between the generally rectangular front and rear trays of the generally rectangular body, the control module being powered by said at least one battery and including a shaft which rotates at different rates, one of the rates of rotation of the shaft being determined by a user setting a knob connected to the control module,
   a colored disk located in the recess of the generally rectangular front tray and secured to the shaft such that the colored disk rotates with the shaft;
   a stationary background disk located in the recess of the generally rectangular front tray in front of the colored disk, the stationary background disk having a slit through which a portion of the colored disk passes such that upon rotation of the shaft a portion of the colored disk rotates in front of the stationary background disk;
   a circular lens located in front of the stationary background disk and secured to the generally rectangular front tray;
   removable boards secured in a cavity in the generally rectangular front tray of the generally rectangular body, each of the boards having a circular opening through which the circular lens passes; and
   a positioner secured to the shaft in front of the circular lens for manually setting the position of the rotatable colored disk.

2. The apparatus of claim 1, wherein the generally rectangular body has openings therethrough for removing the boards from the cavity in the generally rectangular front tray.

3. The apparatus of claim 1, further comprising a generally U-shaped mounting stand pivotally secured to the generally rectangular body.

4. The apparatus of claim 1, further comprising a plurality of markers secured in a marker recess in the generally rectangular body, each of the markers being adapted to be removably secured to the circular lens in a desired location.

5. The apparatus of claim 1, further comprising a wall mount.

6. The apparatus of claim 1, further comprising a volume switch and a speaker.

7. The apparatus of claim 1, wherein the control module is capable of being set to rotate the shaft at more than four different speeds.

8. An apparatus for displaying remaining and elapsed time comprising:
   a body comprising a front tray and a rear tray secured to the front tray, the front tray having a circular recess;
   a control module and at least one battery located between the front and rear trays of the body, the control module being powered by said at least one battery and including a shaft which rotates at different rates, one of the rates of rotation of the shaft being set by a knob connected to the control module,
   a colored disk located in the recess of the front tray and secured to the shaft such that the colored disk rotates with the shaft;
   a stationary background disk located in front of the rotatable colored disk, the stationary background disk having a slit through which a portion of the rotatable colored disk passes upon rotation of the shaft and the rotatable colored disk;
   removable boards secured in a cavity in the front tray of the body, each of the boards having numerical indicia on at least one face of the board to indicate different time periods, each of the time periods corresponding to one of the rates of rotation of the shaft; and
   a positioner secured to the shaft to enable a person to manually position the rotatable colored disk.

9. The apparatus of claim 8, further comprising a mounting stand pivotally secured to the body, the mounting stand being movable between multiple predetermined positions.

10. The apparatus of claim 8, wherein at least one of the boards is double-sided, having numerical indicia on each face indicating different time periods.

11. The apparatus of claim 8, further comprising multiple switches, at least one switch being a three-position switch for off, low or high volume of sound from a speaker located in the body of the apparatus.

12. The apparatus of claim 11, wherein the removable boards are secured in the cavity of the front tray of the body with at least one biasing member.

13. The apparatus of claim 8, further comprising markers secured in a marker recess in the rear portion of the body.

14. The apparatus of claim 8, wherein the control module is capable of being adjusted by a user turning a knob behind the body.

15. The apparatus of claim 8, wherein front and rear trays of the body are generally rectangular.

16. An apparatus for displaying remaining and elapsed time comprising:
   a body comprising a front tray and a rear tray secured together,
   the body having a battery compartment for storing at least one battery, said at least one battery powering a control module located in the body, the control module determining one of multiple speeds at which a shaft rotates to rotate a colored disk secured to the shaft to indicate elapsed and remaining time;
   removable boards secured in a cavity in the front tray of the body with at least one biasing member, at least one of the boards having numerical indicia marks on at least one face of the board to indicate different time periods, each of the time periods corresponding to one of the speeds of rotation of the shaft; and
   a lens, each of the boards having an opening through which the lens passes.

17. The apparatus of claim 16, further a mounting stand pivotally secured to the body.

18. The apparatus of claim 16, wherein the boards are capable of being pushed out of the cavity through openings extending through the body.

19. The apparatus of claim 16, wherein the lens is circular.

20. The apparatus of claim 16, further comprising a wall mount.

\* \* \* \* \*